Jan. 5, 1965 O. K. KELLEY 3,164,034

MULTIPLE STAGE TORQUE CONVERTER DRIVE

Original Filed Dec. 11, 1947 9 Sheets-Sheet 1

Inventor
Oliver K. Kelley

Spencer Willits, Helwig & Baillio
Attorneys

Jan. 5, 1965 O. K. KELLEY 3,164,034

MULTIPLE STAGE TORQUE CONVERTER DRIVE

Original Filed Dec. 11, 1947 9 Sheets-Sheet 2

Inventor
Oliver K. Kelley
By
Spencer, Willits, Helwig & Baillio
Attorneys

MULTIPLE STAGE TORQUE CONVERTER DRIVE

Original Filed Dec. 11, 1947 9 Sheets-Sheet 3

Inventor
Oliver K. Kelley
By
Spencor, Willits, Helwig & Baillio
Attorneys

Jan. 5, 1965 O. K. KELLEY 3,164,034

MULTIPLE STAGE TORQUE CONVERTER DRIVE

Original Filed Dec. 11, 1947 9 Sheets-Sheet 4

Inventor
Oliver K. Kelley

By Spencer, Willits, Helwig & Baillio
Attorneys

Jan. 5, 1965 O. K. KELLEY 3,164,034

MULTIPLE STAGE TORQUE CONVERTER DRIVE

Original Filed Dec. 11, 1947 9 Sheets-Sheet 5

Inventor

Oliver K. Kelley

By Spencer, Willits, Helwig & Baillio

Attorneys

Jan. 5, 1965 O. K. KELLEY 3,164,034

MULTIPLE STAGE TORQUE CONVERTER DRIVE

Original Filed Dec. 11, 1947 9 Sheets-Sheet 6

Inventor
Oliver K. Kelley
By Spencer Willits, Helwig & Baillio
Attorneys

Inventor
Oliver K. Kelley
By
Spencer, Willits, Helwig & Baillio
Attorneys

MULTIPLE STAGE TORQUE CONVERTER DRIVE

Original Filed Dec. 11, 1947 9 Sheets-Sheet 8

Inventor
Oliver K. Kelley
By
Spencer, Willits, Helwig & Baillio
Attorneys

Jan. 5, 1965 O. K. KELLEY 3,164,034

MULTIPLE STAGE TORQUE CONVERTER DRIVE

Original Filed Dec. 11, 1947 9 Sheets-Sheet 9

INVENTOR.
Oliver K. Kelly
BY
F. L. Chisholm
ATTORNEY

United States Patent Office 3,164,034
Patented Jan. 5, 1965

3,164,034
MULTIPLE STAGE TORQUE CONVERTER DRIVE
Oliver Kenneth Kelley, Birmingham, Mich., assignor to General Motors Corporation, Detroit, Mich., a corporation of Delaware
Continuation of application Ser. No. 790,950, Dec. 11, 1947. This application May 24, 1954, Ser. No. 431,868
88 Claims. (Cl. 74—732)

The invention relates broadly to a combination of fluid torque converter and gear drive mechanism which provides a range of conversion of torque through a hydraulic torque converter, and provides for uninterrupted changing of the driving torque of the associate gear mechanism by fluid pressure means. This application is a continuation of Serial No. 790,950, filed December 11, 1947, now abandoned.

The invention relates more specifically to arrangements of such fluid torque converters with gearing, wherein the fluid torque converters are of a type which has an effective operation cycle ranging from maximum torque multiplication to substantial 1-to-1 drive; and to the combination of such torque converters with change speed gearing, which latter is arranged to be changed under torque by fluid pressure actuation and control means.

It pertains further to special fluid pressure devices which are coordinated with ratio selection controls for such drive assemblies, which devices not only provide inherent timing of the shift intervals; but also provide means to regulate the driving torque of plural ratios, which means respond to the degree of torque during inter-ratio transitions.

The invention further pertains to the utilization of plural pump fluid pressure supply means controlled for providing fluid pressure to both the torque converter and the gear change mechanism, and in which the supply means are automatically effective for all of the required operations of the assembly under all drive conditions.

It likewise pertains to the type of drive controls for such devices as have been named above, in which there is a single ratio control operated by the operator, and capable of establishing any available forward or reverse drive ratio by simple motion from one station to another, all other controls being wholly automatic.

A primary object of the invention is to provide a fluid torque converter combined with a gear train which shall have a full range of uninterrupted torque output under all driving ratios, and including full torque and maximum performance operation in the ranges determined by the change of gears of the gear assembly for all of the driving ranges above an initial predetermined speed and torque. A further object of the invention is to provide a gear train driven by the torque converter and having fluid pressure actuated ratio changing mechanism effective for direct forward drive, low ratio range drive, and for reverse drive; the fluid pressure actuated mechanisms being supplied by constantly available line pressure, automatically maintained, and controlled by a single valve, manually selected.

An additional object is to provide a fluid pressure supply system for the aforesaid constructions which likewise maintain a positive pressure in the working space of the torque converter, while maintaining through the same, a steady flow of fluid which is traversed through a cooler device, the flow continuing under all drive conditions.

It is likewise an object of the invention to utilize pressure control valving which automatically maintains the flow of fluid to the torque converter working space, while simultaneously maintaining steady line pressure for the operation of the fluid pressure ratio actuating system. In this connection it is a sub-joined object to control the magnitude of the ratio actuation pressure by a change of selected speed ratio, such that the available pressure for performing the fluid pressure actuation operations will be varied in proportion to the degree of torque multiplication required.

Another object is the provision of special valve means and mechanism which shall be responsive to the degree of torque during upshift and downshift ratio changes, and which introduce a dynamometric characteristic for providing smooth torque shifts under all change of drive operations.

A further object is the utilization of accumulator valve mechanism for the purpose of regulating the shift timing interval of all forward drive speed ratio changes.

In previously known constructions in which the fluid drive is obtained by bladed turbine devices known as fluid torque converters, it has not been known to place such converters between the source of driving power and a speed change gearing unit which afforded full torque shift. In the case of gear units shown in prior art arranged in series with a primary drive torque converter, it has been necessary to unload the drive in some manner for the change of gear ratio, this process resulting in dwell interval losses, as well as jerky transitions tending to shock the drive mechanism and cause discomfort to the driver and passengers. The present invention avoids these difficulties by first utilizing a special form of torque converter which is capable of delivering full torque acceleration from maximum reduction to substantial 1-to1 drive without interruption, and second, by utilizing a special form of torque-regulated gear ratio shift system which inherently controls the transfer of torque from one forward drive ratio to the other by devices which measure not only the degree of existing torque, but also which establish a predetermined degree of torque overlap during the drive change intervals. The result of this combination is a drive assembly having units which inherently provide full ranges of torque multiplication, with full capability of change between said ranges without surges of torque which could be noticed as shock accelerations or decelerations during the shift intervals. In other words, the combination stated above permits the car driver to accelerate from standstill to full speed in either forward drive gear range, or to initiate acceleration in one range and shift to the other during the acceleration interval. In practice, with the motor car engines of the present day, this combination enables the car driver to obtain maximum performance when needed, without the inconvenience of performing any manual operation other than movement of a ratio control handle from one station to another. For ordinary use this stated shift of the control handle has been found unnecessary, and the lower range of speed ratio afforded, is used only for emergency low range drive purposes. It should be noted however that where the ultimate acceleration performance of the drive equipped with this invention is demanded, such is available. The control handle also serves as a parking brake controller.

The gear train used herein in the combination is believed to possess some elements of novelty although the general form is thought to be old. As will be understood further the gear train is equipped with a driving sun gear and a reaction sun gear which are clutch coupled for 1-to-1 drive of the output connected carrier. The driving sun gear meshes with a long planet which is meshed with a short planet, the latter meshing with the reaction sun gear. An annulus gear meshing with the short planet is braked for establishing reverse gear drive, while the reaction sun gear is braked for low forward drive. This train is supported against rocking couples by a bearing sleeve carried on the reaction annulus gear and bearing against the adjacent cylindrical face of the output carrier. The compact gear arrangement enables the clutch mechanism to be compartmented adjacent the gearing and supported by web extensions of the casing through which the controlling fluid pressure is fed. As will be understood further the gear and clutch assembly is compartmented separately from the fluid torque converter, with supply pump passages connected through a casing web section between the converter and gear unit compartments. The construction provides unusual rigidity and exact alignment, while permitting space for converter fluid passages, and the controls. A second web extension of the casing assembly at the rear of the gear unit is formed to house a pump which supplies the fluid pressure system when the vehicle is moving forward.

The web extensions of the casing between the converter and gear unit compartments likewise provide reaction support for one-way brakes and prevent the backward rotation of a plurality of stators of the torque converter.

The torque converted consists of five bladed elements located so that the impeller is in the outflow zone of the working space, the driven turbine rotor is in the inflow zone, the two rotatable reaction rotors are in the inner radial zone bridging inflow with outflow, and the fifth bladed element is an auxiliary impeller located in the radially inward portion of the outflow zone adjacent the second of the two reaction rotors. The reaction rotors are prevented from backward rotation by 1-way brake devices, and the auxiliary impeller is connected by a 1-way clutch to the main impeller so that the auxiliary impeller may run forwardly faster than the main impeller. This converter provides a full scale of uninterrupted drive from initial maximum torque multiplication to 1-to-1 drive between input and output, which in combination with the change gear unit equipped with full-torque shift actuation and control facilities, gives a wholly new drive acceleration from standstill to 1-to-1 drive, in which the range of ratio may be changed at any time.

Further advantages, novelties and new and useful results appear in the following description and attached drawings which represent one example of the invention herewith, in which.

Figure 1:
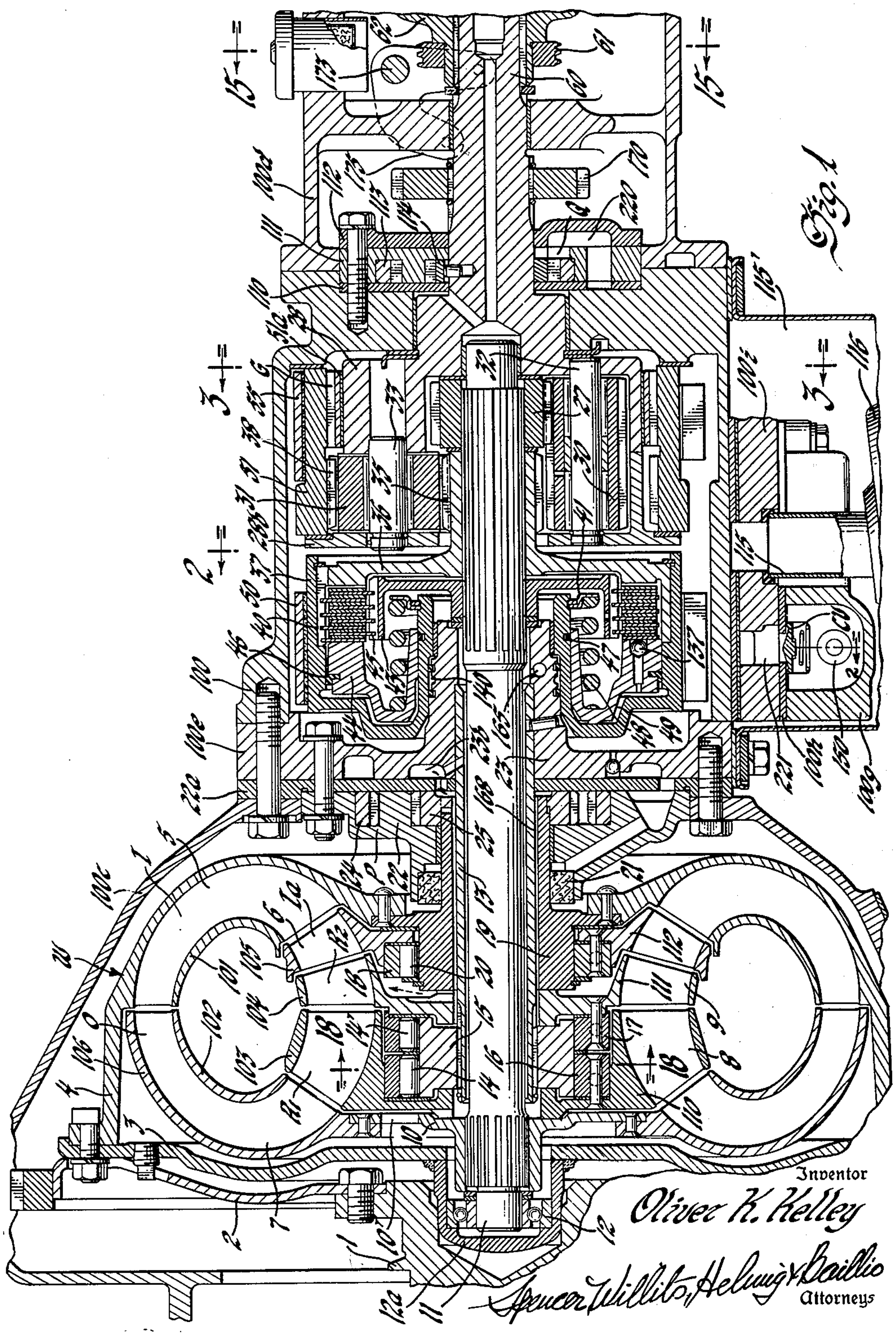
FIGURE 1 is a longitudinal section of a drive mechanism embodying one form of the invention.
Figure 3:
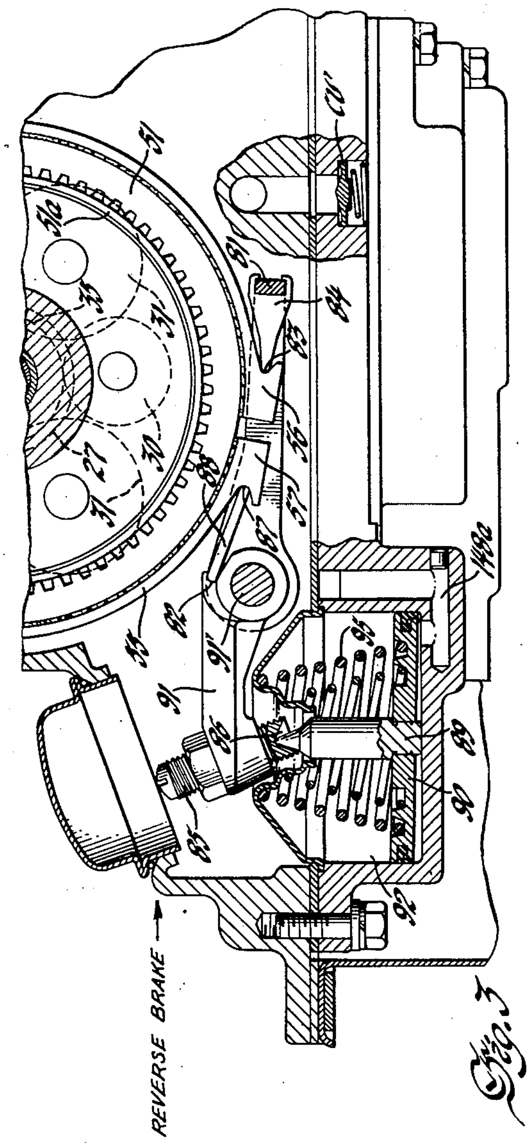
FIGURE 3 is a similar section taken at 3—3 of FIGURE 1.
Figure 2:
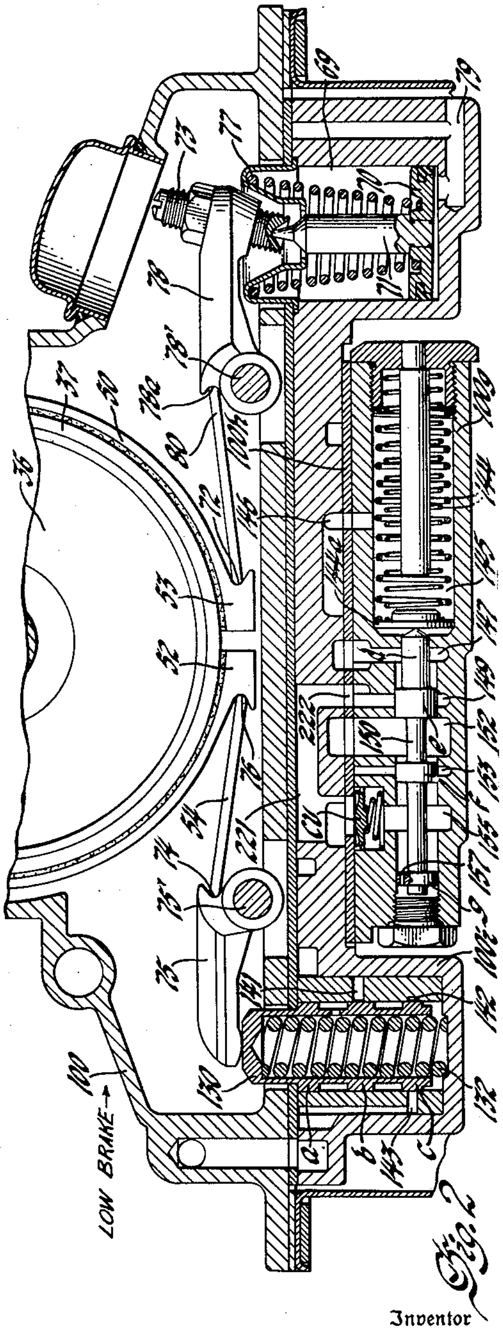
FIGURE 2 is a part section taken at 2—2 of FIG. 1 looking forward or to the left in FIG. 1.
Figure 11:
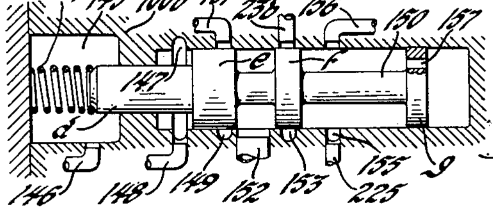
FIGURE 11 is a schematic section of a fluid pressure regulator valve shown in FIG. 2, and explained further in connection with FIGS. 12 to 14.
Figure 12:
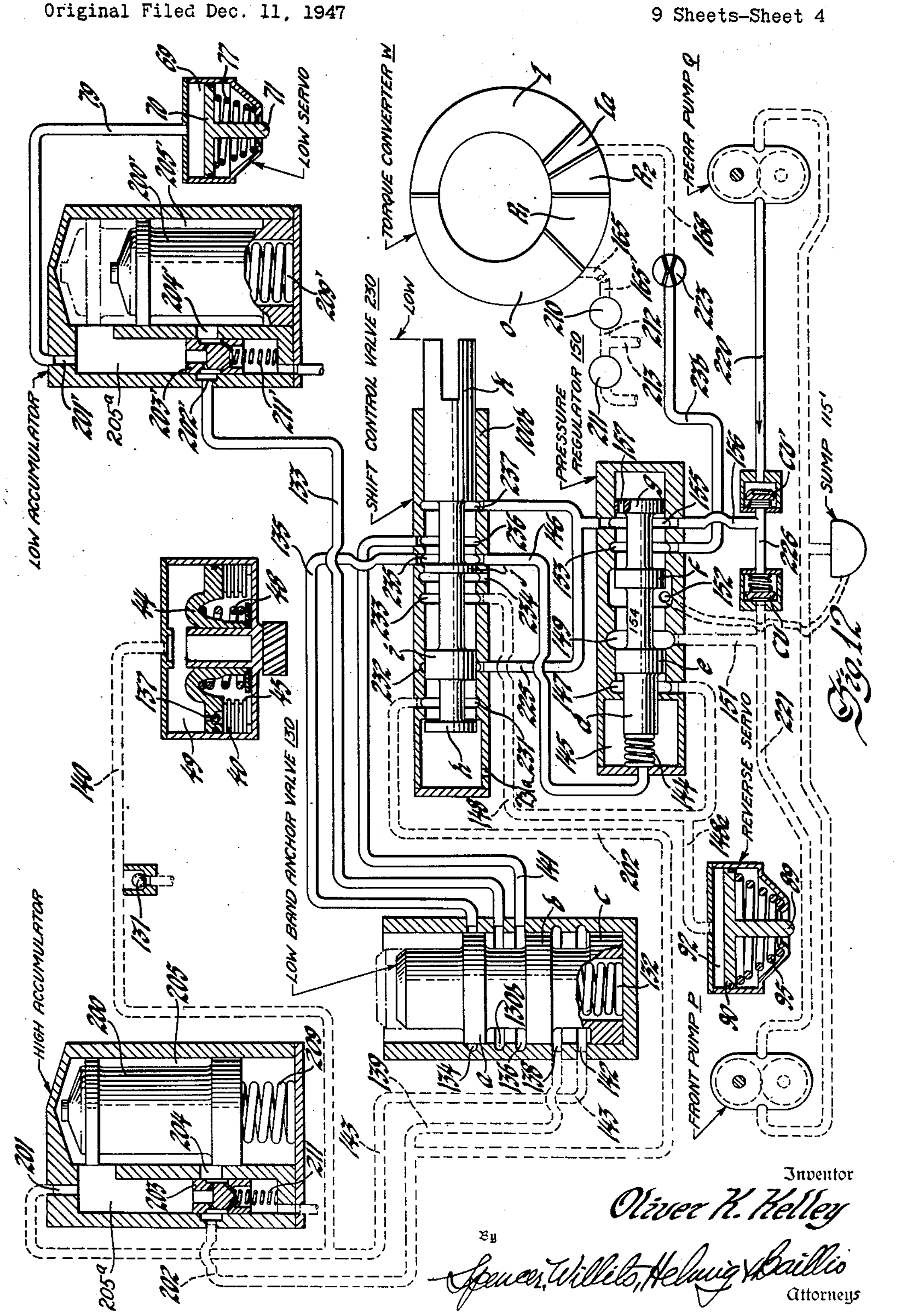

FIGURE 12 is a schematic diagram embodying the subject matter of FIGS. 4 to 11 specifically, and combined with the servo operating mechanism of FIGS. 1, 2 and 3. The diagram also shows the complete pumping system, and the gear shift control valving, with the parts stationed in their low gear drive positions. Pressurized conduits are shown in full lines. Dash lines indicate vented conduits.

Figure 13:
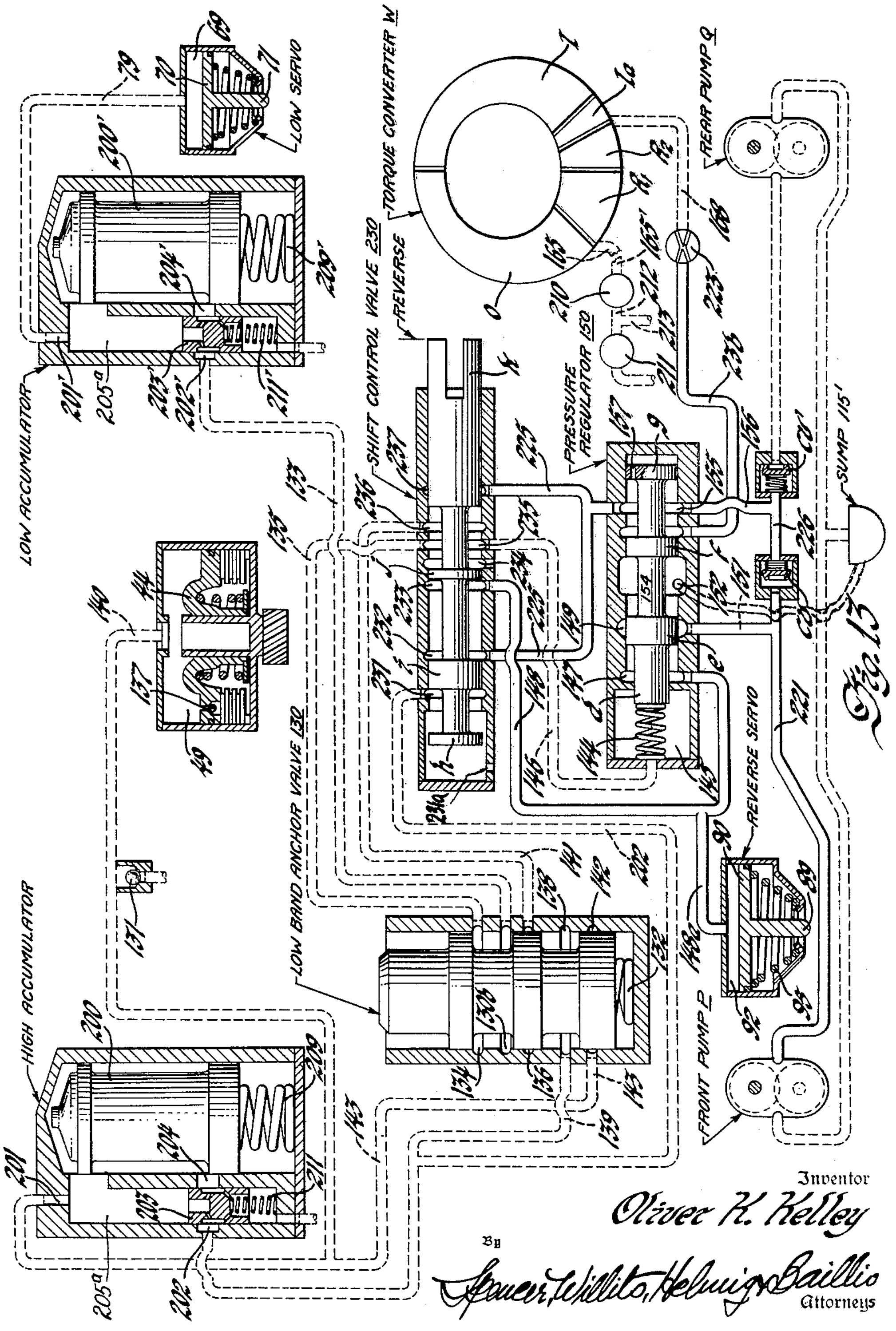

FIGURE 13 is like FIG. 12, but shows the parts as stationed for providing reverse gear drive.

Figure 14:
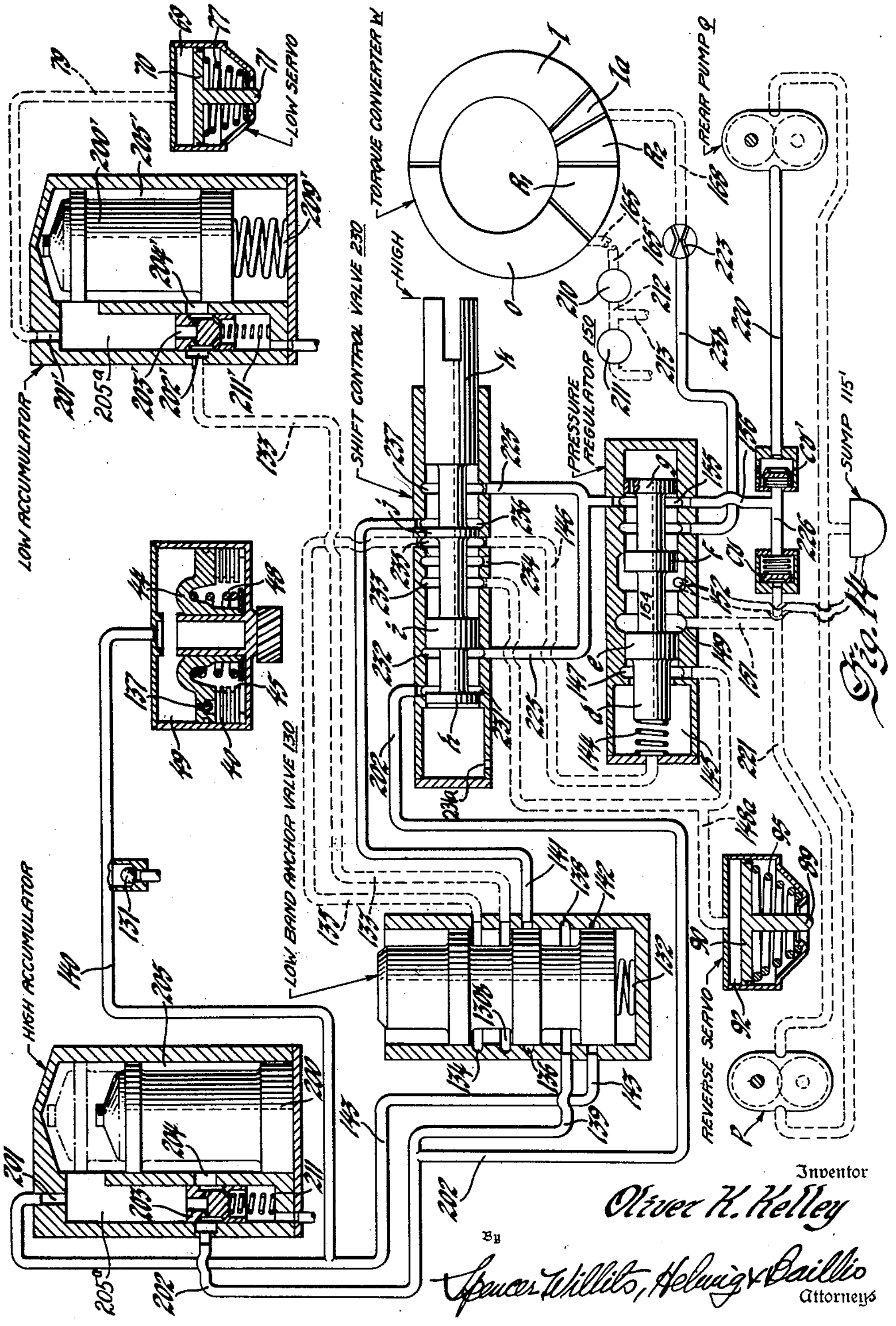

FIGURE 14 is similar to FIGS. 12 and 13, but shows the parts stationed for establishing direct drive by the gear units of the assembly.

Figure 15:
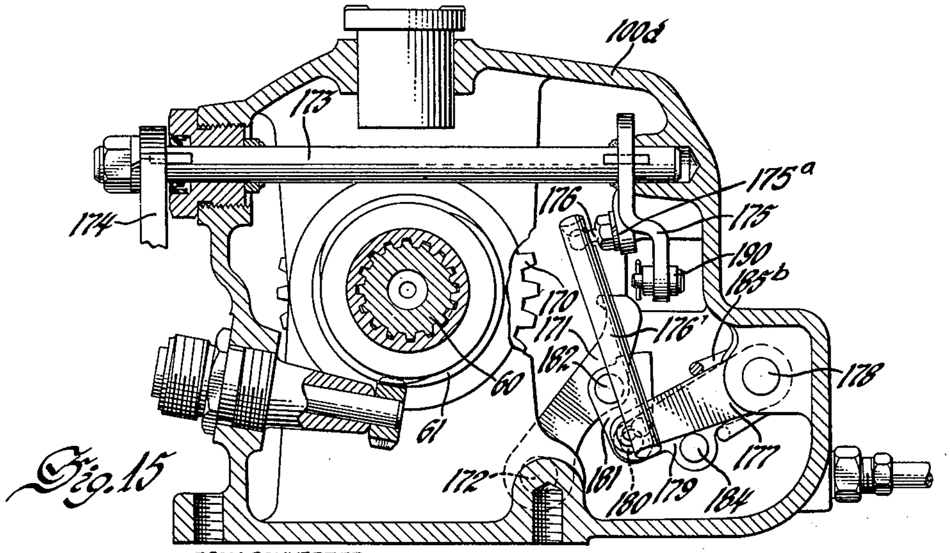

FIGURE 15 is a sectional view taken at 15—15 of FIG. 1 to show the manual controls for the gear shift valving and for the parking brake.

Figures 16, 17, 18:
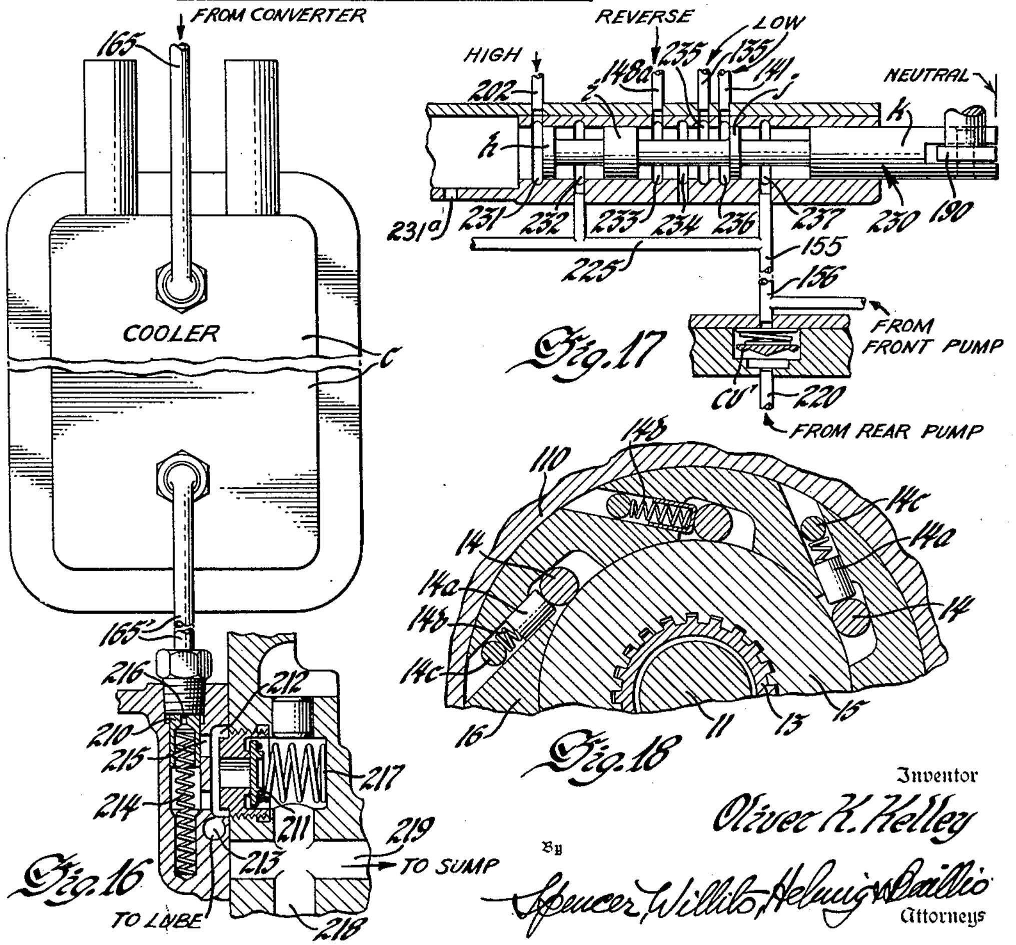

FIGURE 16 represents the arrangement of the fluid outflow passages from the converter and cooler, embodying the pressure control valving shown schematically in FIGS. 12 to 14.

FIGURE 17 is a separate showing of the shift control valve of FIGS. 12 to 14 for the purpose of indicating its operating connection with the structure of FIG. 15, and to show its neutral drive station.

FIGURE 18 is a representation of one of the one-way brake mechanisms shown in FIG. 1, the part section being taken at 18—18.

Figures 19, 20:
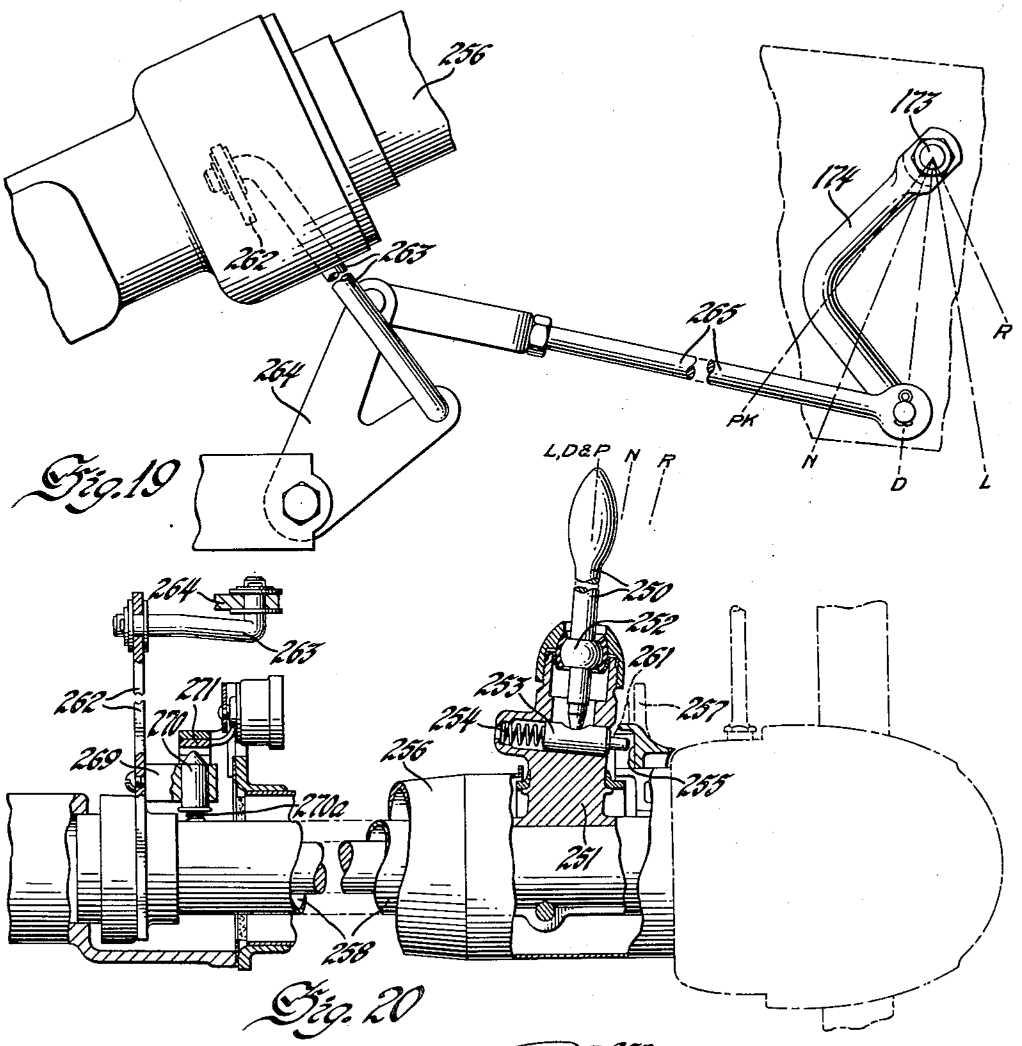

FIGURE 19 is an elevation view of portions of the gear box and steering column as viewed from the left of FIG. 15, showing the external control linkage for the operator.

FIGURE 20 is a partly sectional view of the control mechanism located on the steering column of a vehicle, and including the mechanism at the lower end of the steering column which provides control of the poppet stations for setting the mechanism of FIG. 19 accurately.

Figure 21:
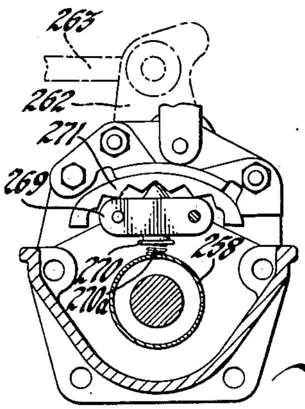

FIGURE 21 is a cross sectional view through the mechanism of FIG. 20 to show the poppet control mechanism.

Figure 22:
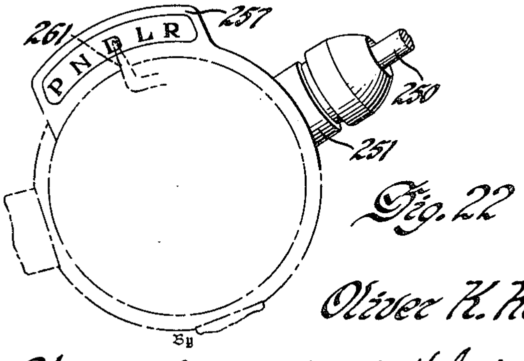

FIGURE 22 is a view of the mechanism of FIG. 20 showing the controls as seen by the vehicle driver.

Figure 23:
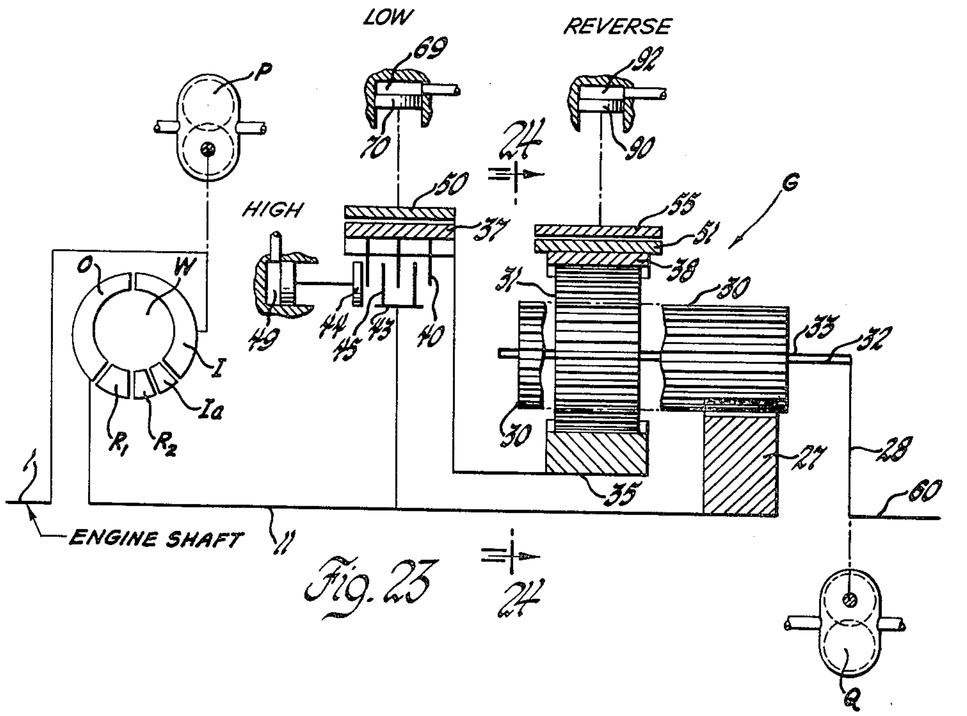
Figure 24:
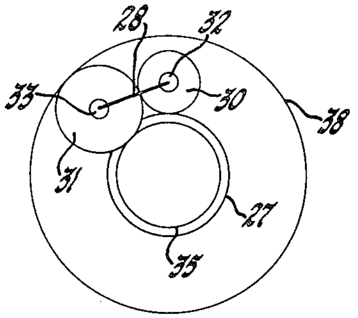

FIGURE 23 is a simplified diagrammatic showing of the transmission shown in FIG. 1, being the upper half of a symmetrical longitudinal section corresponding to FIG. 1, and FIGURE 24 is a schematic transverse section of the complete gearing taken on the line 24—24 of FIG. 23.

FIGURE 1 is a vertical longitudinal section taken through the transmission assembly of the invention, to show the relative positions of the parts and units. The vehicle engine is located at the left, and drives a fluid torque converter generally designated W, which is arranged to drive the output shaft 60 through a two-speed and reverse planetary gear unit of a somewhat novel nature.

The forward portion of the assembly including the torque converter is contained within the housing 100*c*, and the gear portion within the second housing 100 continuous with the first, and the output shaft 60 within the rear end section 100*d*.

The engine crankshaft 1 has a flange bolted to a flexplate or fly-wheel 2 which is bolted to a front cover 3 of a drum 4 acting as a container for the converter unit W. The drum 4 comprises the shell or backing member for the blades 5 of the impeller I of the converter, which deliver circulating liquid to the blades 7 of the output rotor or turbine O. A separate impeller rotor I*a* having its blades 6 located inward radially from the blades 5 has its hub 112 attached to the outer race 18 of a one-way clutch and the race 18, with inner race 19 attached to drum 4, provide a channel for one-way clutch members 20. Blades 6 are held in core section 105. The outer race 18 is provided with cam slots set at an angle with respect to the direction of rotation as shown in the example of FIG. 18, such that the auxiliary impeller I*a* may rotate forwardly faster than the primary impeller I, but never slower than the latter.

The working space of the converter W is completed by two reaction rotors $R_1$ and $R_2$ having blades at 8 and 9, the first of which receives fluid from the rotor O, delivering same to reaction wheel blades 9, which latter in turn deliver the fluid to the auxiliary impeller I*a* having blades 6. A radial web 100*e* is bolted between housing sections 100*c* and 100, and is keyed to a cylindrical sleeve 13 splined to an inner race member 15. An outer cam member 16 is attached to reaction rotor $R_1$, and the outer cam member 17 is attached to the reaction rotor $R_2$. One-way brake locking members 14 lie between the members 15 and 16, and the one-way brake members 14′ lie between member 15 and outer member 17. These one-way brakes prevent backward rotation of the reaction rotors $R_1$ and $R_2$ but to permit free forward rotation thereof.

The output rotor O is mounted on a hub 10 which is splined to the centrally located shaft 11, which is supported in a piece 12*a* fixed to the flywheel 3 and supporting pilot bearing 12. The shaft 11 constitutes the output or driven shaft of the torque converter, and the input or driving shaft of the gearing. It extends to the right where it is splined to sun gear 27, and to clutch hub 43.

The torque converter W shown here is of the general type disclosed in Letters Patent to Allan Coats, U.S. 1,760,480, issued May 27, 1930, but differs therefrom in certain important respects, the differences residing in the blade and rotor arrangement, in the relative operating ranges of circumferential fluid velocity and toroidal velocity, and in the use of an auxiliary impeller I*a* 1-way clutched to the main impeller I to receive the outflow of the second reaction wheel $R_2$, and in other particulars.

The shell 106 and core section 102 support blades 7 of rotor O on hub 10. The hub 110 and core section 103 support blades 8 of rotor $R_1$. The hub 111 and core section 104 support blades 9 of rotor $R_2$. Blades 5 of impeller I are supported in core section 101 and drum 4. The fluid working space lies outside elements 101 to 105 and inside elements 4, 106, 110, 111 and 112.

The detail of FIG. 18 corresponds to the 1-way clutch or brake structures of FIG. 1. The cam slots of member 18 are directionally taken so that race 18 may overrun while rollers 20 idle.

Pumps P and Q are provided for maintaining the working space of the converter W filled at all times during its operating cycle, and for providing servo pressures required to actuate the torque establishing devices or speed ratio-determining elements of the gear unit, to be described further.

The front pump P is supported by the radial portion of the part 100*e*, against which is fitted the pump body 22 and plate 22*a*, properly formed to accommodate the driven pump gear 24 and the driving pump gear 25 fixed to an axial extension of race piece 19 which is bolted to the drum 4. The pump construction shown in FIG. 1 is inherently adapted to deliver a quantity of liquid which is proportional to the number of rotations of the engine, as is known in the art. The ported plate 100*e* is located between the housing sections 100 and 100*c*, being formed into an axial sleeve 23 which surrounds a portion of the shaft 11. The pump passages and conduits of the system will be described further in detail. The seal 21 is located between an axially extending portion of the pump body 22 and the axially extending portion 19 of the drum 4.

The rear pump Q is assembled in the joining web of casing sections 100 and 100*d*, the pump assembly comprising three portions 110', 111' and 112'. The portion 110' is a ported plate forming an endwall, the portion 111' is recessed and provides a housing and bearing for the driven gear 113, the meshing driving gear 114 being keyed to shaft 60. The ported cover plate 112' completes the assembly, and is bolted to the endwall of casing section 100. The pump suction spaces connected to suction main 115 open to the sump 115' thru strainer 116 to be described later. The rear pump delivers liquid at a rate measured by the forward speed of rotation of the output shaft 60.

The dashed arrows leading from space 23*b* of front pump end plate 100*e* indicate the flow of oil from pump P to the converter working space, the passage 168 leading between members 13 and 19. The oil flows radially outward between the hub 111 of rotor 9 and the 1-way clutch 18–19–20, and enters the space between the blades 6 of the auxiliary impeller I*a* and the blades 9 of the second reaction rotor $R_2$. Here the oil is accelerated into the circulatory flow, and a portion of the oil body escapes at the outer radial parting zone, to flow into the space radially outward of, and to the left of turbine output member O, restrained between cover plate 3, drum 4, and the back of rotor shell 106. Another portion escapes between 7 and 8.

Oil is extracted from the working space stream, radially inward of the space between cover plate 3 and turbine member O, thru passage 10' in hub 10, flowing inward at the right of hub 10, and along the space external of shaft 11 inside the axial portion of non-rotating casing element 100*e* and sleeve 13 and from thence radially outward by delivery passage 165 for connection to the flow control system of FIG. 17.

The gear unit G is made up of carrier 28 attached to or integral with shaft 60 and having a double set of meshing planets 30 and 31 supported on separate spindles 32 and 33 respectively, carrier 28 having web 28*b* at the left. The planets 30 extend to full width between the radial portions of the carrier 28 and mesh internally with the input sun gear 27, and with the planets 31 as indicated in the upper part of FIG. 3. A second or reaction sun gear 35 is meshed with the planets 31 and it attached to a radial web 36 of a drum 37 which is splined internally to accommodate clutch plates 40. The left portion of the drum 37 has a radial flange terminating in an inner sleeve which extends axially to the right, and is fitted with the keyed flange 41 acting as a spring retainer. The internal clutch plate hub 43 is splined to shaft 11, and is externally splined to acommodate plates 45, which mate with clutch plates 40. A clutch presser piston 44 is mounted to slide inside the drum 37, being fitted with seal members 46 and 47, and is normally held to the left by clutch release spring 48, which bears against the previously described flange 41. As will be understood further, fluid pressure may be admitted at the left in cylinder 49 between the radial wall of the drum 37 and piston 44 to engage clutch plates 40–45 for establishing direct drive between shafts 11 and 60 by locking together the sun gears 27 and 35.

The drum 37 is surrounded by a brake member 50 so that it may be held against rotation and cause the sun gear 35 to stand still; this effect requiring the planet pinions 31 to roll around the sun gear 35 when the input sun gear 27 is rotated.

Therefore, when brake 50 is actuated, the shaft 11 drives the shaft 60 at low gear ratio.

Surrounding the planet gears 31 is a meshing annulus gear 38 attached to drum 51 supported on a bronze ring 51*a* bearing on a cylindrical face of carrier 28. The annulus gear 38 and drum 51 are surrounded by a brake 55 for stopping the drum and annulus gear 38 to establish reverse gear drive between the shafts 11 and 60.

The rear portion of the gear box has the shaft 60 supported in the webs of sections 100, and 100*d*. The shaft 60 is splined for small speedometer gear 61 and for universal joint coupling sleeve 62. Leakage of oil from 100*d* is prevented by a seal of the universal joint connection housing, not shown.

As described to this point, the engine drives the torque converter W, which in turn drives the gear unit G, which determines one of three driving conditions for shaft 60; namely, low range, high range, or reverse gear drive.

FIG. 2 is a sectional view taken across the transmission to the right of the parting line between the housing sections 100*e*–100 at 2—2. This view is given to relate the fluid control system to the remainder of the structure, and to show the fluid pressure passages connecting the work units, the fluid working space of the converter, the valving, the accumulators, and the pumps P and Q.

In this view the structures of the regulator valve 150 and the reaction torque measuring valve 130 are shown. FIGS. 9–14 show their hydraulic connections.

FIG. 2 shows a section of the actuating system for the low brake member 50. The ends of the member 50 are formed into bosses 52 and 53, the anchor boss 52 being notched at 76 for anchor strut 54. A lever 75 is pivoted on a shaft 75' mounted in casing 100 and bears against torque-responsive anchor valve 130 and is notched at 74 for the adjacent end of the strut 54. The apply end 53 of band 50 is notched at 72 for apply strut 80 seated in notch 78a of apply lever 78 pivoted on shaft 78' mounted in the casing.

The apply lever 78 is fitted with an adjustable stud 73 which is notched for the end of piston rod 71, the latter being surrounded by release spring 77 and fixed to piston 70.

The housing 100 is formed to provide the apply cylinder 69 for the brake actuating piston 70. The brake releasing spring 77 serves to release the band 50 from the drum 37 except when fluid pressure is admitted to cylinder 69.

Passage 79 is for admission of fluid pressure from the hydraulic control system to the cylinder 69.

A somewhat similar arrangement is provided in FIG. 3 for the operation of the reverse brake 55, the section being taken at 3—3 of FIG. 1. Brake member end bosses 56 and 57 are provided. The apply boss 57 is notched at 87 for an actuating strut 88 operated by a lever 91. The anchor boss 56 is notched at 83 for anchor member 84 supported by a strap 81 which is looped around the pivot pin 91'. The lever 91 has adjustment stud 85 notched at 86 for piston rod 89. Piston 90 in cylinder 92 is fixed to rod 89, and is held in brake-releasing position by spring 95 except when fluid pressure is supplied to cylinder 92 by passage 148a.

Application of fluid pressure in cylinder 92 to the head of piston 90 causes the piston to travel upward against spring 95 to exert a thrust on the lever 91 to move strut 88, which forces the movable band end at 57 to the right to clamp band 55 on drum 51.

This motion compresses the release springs 95, which permit the inherent resilience of the band to release the brake when the fluid pressure under the head of piston 90 is removed.

Actuating pressure for loading the plates 40, 45 of the direct drive clutch 40–45 of FIG. 1 is supplied by passages connecting the output of the pumps P and Q thru control valving as diagrammed in FIGS. 12 to 14, to cylinder space 49 inside drum 37 to move annular piston 44 against spring 48.

FIGURE 18 is a typical part section of one of the one-way clutches or brakes used in the torque converter W. The external cam plate member 16 is representative of any one of the three outer members 16, 17 or 18 in FIG. 1, and the inner member 15 may be either of inner races 15 or 19. In FIGURE 18 these are numbered as 17, for the outer member, and 15 for the inner member, the locking members in the present instance being rollers 14 which are loaded against slip by plungers 14a, springs 14b and spring retainers 14c. As will be understood, the part section of FIGURE 18 is a view looking aft from the front of the transmission.

In the toothed gear unit G, the driving sun gear 27 meshes with the low range planet gears 30, and the reversing planet gears 31 mesh with both the reaction sun gear 35 and the reversing annulus gear 38.

1–1 drive is obtained by applying fluid pressure to clutch piston 44 causing plates 40–45 to lock the unit.

Reverse is obtained by holding annulus gear 38 with brake 55.

Low gear is obtained by holding sun gear 35 and drum 37 with brake 50.

The direct drive clutch 40–45, the low brake 50–37 and the reverse brake 55–51 are all friction couplings or friction torque-establishing devices having friction elements which when engaged establish torque or complete a driving connection between the driving or input shaft 11 and the driven or output shaft 60. Each of the friction torque-establishing devices is actuated by a servo in the form of a variable volume fluid pressure chamber which constitutes an expansible chamber motor which establishes torque in the friction device which, as is known in the art, is measured by the pressure in the chamber. Low pressure in the chamber engages the friction elements lightly, which may be termed partial engagement in which condition they are capable of transmitting only low torque beyond which they slip. Rate of increase of pressure in the chamber determines the rate of increase of torque in the friction torque-establishing device. Maximum or full pressure in the chamber engages the friction elements with maximum or full force, which may be called full engagement, in which condition they transmit full torque.

Shifts into low and into direct drive are controlled accurately by timing and coordinating devices which assure that there will not be any sudden lurches of torque, so that the vehicle operator may move the ratio shift controller for the valving at will, and obtain an extremely smooth ratio change under all driving conditions. This control system utilizes a mechanism which responds to the instant torque conditions, and applies a corrective factor to the servo pressure delivery lines involved.

Should the engine fail to start, towing or pushing the vehicle enables the rear pump Q to supply the hydraulic system requirements, as will be understood further.

The master regulator valve 150 of FIGS. 2, 11, and 12 to 14 constitutes a pump-selector valve which vents or unloads the front pump, causing it to idle after the rear pump Q reaches sufficient speed to supply the system. This shift from P to Q may occur normally between 10 and 40 miles per hour. Each pump is equipped with check valves CV and CV', FIG. 12, respectively to prevent back flow when either pump is not providing its working pressure. Reference to FIGS. 12 to 14 will show the relationship of the pump feed lines.

In the position immediately following, the separate elements and groups of the servo pressure system are first individually discussed.

The 1 to 1 drive clutch cylinder 49 has a given volumetric capacity, requiring filling before final engagement with a finite quantity of oil. To make final engagement smooth, the oil is first admitted rapidly to the cylinder 49 to effect partial engagement of clutch plates 40–45 quickly. Then, in response to predetermined movement of the plates, or to partial engagement, which is signalled by abrupt increase of pressure in the cylinder 49, the flow is slowed, in order to build up full pressure and full torque slowly or gradually. This is accomplished with the aid of an accumulator enclosing a piston 200 which is also a pressure-responsive valve connected to the clutch cylinder feed line 201, shown in FIGS. 4 to 6, and 12 to 14.

Figure 4:
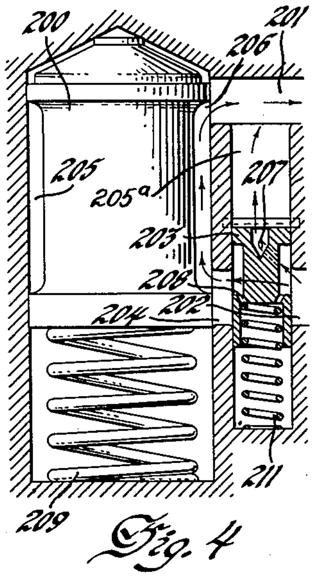
FIGURES 4, 5 and 6 show the stages of operation of a special control valve arrangement for the coordination and timing of the ratio shifts in the gear unit of the invention.

In the initial stage of engagement of the clutch, the parts are as shown in FIG. 4. The servo oil feed passage 202 admits clutch servo oil around the neck of dump, check, or pilot valve 203, the oil flowing freely and rapidly thru fast port 204, fast flow valve passage 205 and fast flow port 206 to the passage 201, connected to the clutch cylinder 49 of FIGS. 1 and 14.

The bleed holes or restricted orifices 207 and 208 in the valve 203 permit small quantities of oil to flow out above and below the valve 203.

Figure 5:
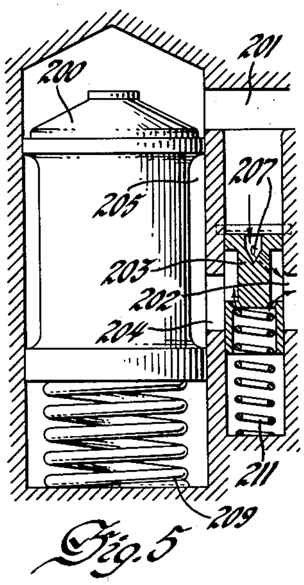

When clutch actuator piston 44 meets the resistance of plates 40–45, in FIG. 1, there is a rapid rise of pressure, effective throughout conduit 201 and in the communicating space above valve 200 tending to shift the valve 200 from the position of FIG. 4 downward against spring 209 to the FIG. 5 position.

The rate of increase of pressure in the clutch chamber 49 is reduced by the expanding volume into which the line 202 discharges oil, which expanding volume is effected by movement of the accumulator wall formed by the piston 200. During this movement the upper land on the piston closes the by-pass around the orifice 207, that is the fast flow passage formed by the piston groove 205 between large port 204 and clutch passage 201. The clutch passage 201 is now connected with the pressure feed passage 202 only thru the slow-flow passage formed by small bleed hole 207 in the top of valve 203, which provides a slower pressure build-up on the clutch piston 44 as the spring 209 is further compressed by valve 200.

Figure 6:
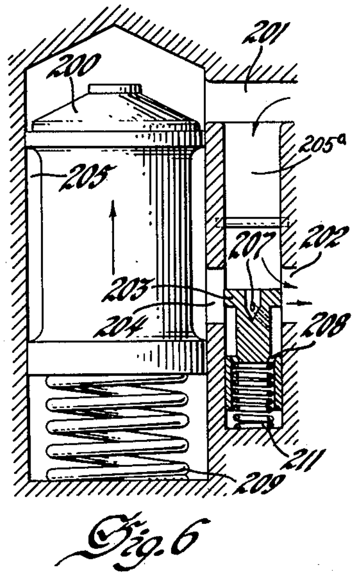

When the back pressure in passage 201, which is to say in the clutch chamber and in the accumulator, equals pump or line pressure, the clutch 40–45 is fully engaged, and valve 200 is at its lowermost point with spring 209 fully compressed, even lower than positions shown in FIGS. 5 or 6.

When the control valving for pressure passage 202 is connected to exhaust, outflow from clutch passage 201, bleed hole 207, and from the space below check valve 203 thru bleed holes 208 begins. Since the relief of the small volume of oil under valve 203 thru 208 occurs more quickly, the force of spring 209 on piston valve 200 exerted on the oil body overcomes the resistance of valve spring 211, causing valve 203 to move down to the FIG. 6 position, and open a second fast-flow passage 205*a* for rapid release of the clutch. The valve 200 may now move upward to its former position of FIG. 4, urged by spring 209, and valve 203 likewise returns to the position of FIG. 4.

The operational results of this combination of accumulator and dump valves are rapid clutch cylinder filling, gradual clutch engagement, and rapid relief for disengagement.

The above type of operation is likewise provided by a second combination, of the same description as shown in FIGS. 4 to 6 inclusive, for the brake 50, operating in the same manner, but not identical in dimensions of parts or spring force values. The diagram arrangement of FIGS. 12 to 14 shows both of the accumulator-and-dump valve combinations, one for the direct drive clutch control as in FIGS. 4 to 6, and the other for the control of the pressure which operates brake 50 for establishing the low gear range. The corresponding numbers are prime noted for the latter.

A special provision for further correlating the action of the low gear band 50 and the clutch 40–45 is disclosed. This enables the shift between low and high range to be made with particular smoothness, and a minimum of torque slip.

Figures 7, 8, 9, 10:
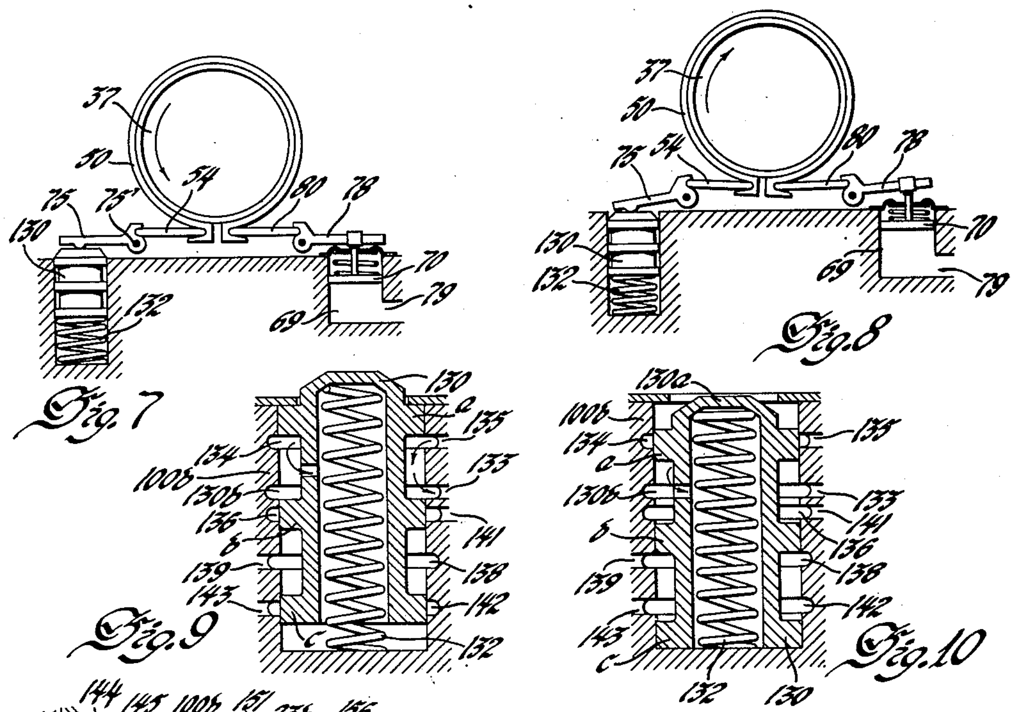
FIGURES 7 and 8 are schematic diagrams of the structure shown in FIG. 2 and should be compared with FIGS. 9 and 10 which represent the end-point operation of a special control valve arrangement which responds to the degree of torque for controlling the ratio shift interval.

The diagram of FIG. 7 represents the structure of FIG. 2, and shows the low band 50 engaged by struts 54 and 80, the strut 80 being moved by lever 78 and piston 70 of cylinder 69. The strut 54 is similarly held in a notch of lever 75 and in engagement with the end of the valve 130 pressed against the lever 75 by spring 132. Valve 130 may be termed an "anchor" valve.

Whenever band 50 is actuated to grip drum 37 by piston 70 the torsional drag moves the band in the direction of drum rotation, the force of the reaction tending to move valve 130 against spring 132 as shown in FIG. 8 to provide a form of dynamometric measuring device.

The diagrams of FIGS. 7 and 8 show by the arrows the action described. When the fluid pressure on piston 70 is relieved, and the band 50 released, the torque reaction force compressing the anchor valve spring 132 disappears, the valve returning to the FIG. 7 position.

The detail of the porting of anchor valve 130 is shown in FIGS. 9 and 10. The casing section 100*b* is bored for the valve 130 which has a projecting end 130*a*, and three bosses *a*, *b*, and *c*. The hollow interior accommodates spring 132 and is vented at 130*b*. As will be explained below, the bosses or lands *a* and *b* collectively constitute valve means responsive to torque reaction on the brake for controlling maintenance of pressure in the low apply cylinder 69 when the transmission is shifted from low to high, and the land or boss *c* is valve means which opens and closes the connection between conduits 139 and 143 which together constitute a by-pass around the high accumulator mechanism.

The central port 130*b* connects on the right to the passage 133 connected to passage 79 for the cylinder 69 of the brake 50, for establishing low gear drive.

The upper port 134 is connected to passage 135 leading from the shift control valve 230 of FIGS. 12 to 14. The lower port 136 is joined to passage 141 from the relay port 236 near the right end of the shift valve 230. The port 138 is joined to passage 139 connected to primary clutch feed line 202 of FIGS. 12 to 14. Port 142 connects thru passages 143, and 140 directly to the clutch cylinder 49 of FIG. 1.

The lower gear servo feed lines 135, 133, 141 and the direct drive clutch feed lines 143, 139 are effectively routed thru the porting of the anchor valve 130 so that the valve response to reaction torque furnishes a regulatory control both on the application of clutch 40–45 and low band 50.

Upon shift into low as determined by the shifter valving of FIGS. 12 to 14, the anchor valve 130 is first positioned as shown in FIGS. 7 and 9, in its upper position, until there is mechanical drag induced by low gear drive reaction between band 50 and drum 37, which forces the valve 130 to move against spring 132 to the lower position of FIGS. 8 and 10, in which position port 134 is closed by the boss *a*, ports 130*b* and 136 are connected, and ports 138 and 142 are connected. The low servo passage 133 is now fed thru the ports 1330*b* and 136 by relay passage 141 from the positioning of control valve 230. The valve 130 is down in the FIG. 10 position during the drive torque interval of low gear, and may only rise momentarily under high speed coasting conditions.

When the valve 230 of FIGS. 12 to 14 is shifted to the direct drive feed position, under torque, the feed to port 136 by line 141 continues while the feed by line 135 to port 134 is exhausted at port 234 of valve 230.

Pressure from line 141 thru ports 136, 130*b* thru line 133 maintains the holding force on the low gear actuator piston 70.

Pressure from shifter valve port 231 in valve 230 is fed by line 202 and line 139 to port 138 of valve 130, thru port 142 to line 143, to provide a direct feed of pressure into the clutch cylinder 149. This provides quick filling of the clutch cylinder to initiate the assumption of the torque by the clutch plates, so that a condition exists in which no further torque is carried by the low reaction gearing.

As the clutch plates 40–45 are loaded by piston 44 the force of torque reaction on the band 60 falls off, since the clutch plates now sustain an increasing fraction of the torque load. Valve 130 therefore is moved upwardly to the position of FIG. 7, by the torque-reaction measuring spring 132.

This is the critical point of the torque reversal in the shift. The clutch holding power must be built up to a higher value so that the engine may be decelerated or pulled down to a speed commensurate with 1-to-1 ratio, without a noticeable surge in the delivery of torque.

When the spring 132 has move valve 130 up a given distance, the valve 130 opens the port 130*b* and passage 133 to exhaust thru port 134 and line 135 via the shifter valve 230, releasing pressure from the brake cylinder 69. This releases band 50. At this point the valve 130 has blocked communication between ports 142 and 138, which interrupts the rapid filling which had been going on thru line 143. Further clutch filling now proceeds, feeding thru the orifice 207 of valve 203 as described in connection with FIGS. 4, 5 and 6. After this action the plates 40–45 are fully engaged under full pressure and the shift to direct has been controlled on a basis of exactly measured torque reaction, with the torque overlap action itself as the master control force. By this process, the engine cannot run away, and there is no lurch or bump in the overall drive of shaft 60.

When the shift control valve 230 of FIGS. 12 to 14 is moved to establish low, the anchor valve 130 is moved from the position of FIG. 9 to that of FIG. 10 thru the inverse sequence of flow control operations, the timing action being substantially the same for smooth transfer from direct coupled gear torque to reduction torque reaction.

The action of the master pressure regulator valve 150 of FIGS. 2 and 11 should be studied before dealing with the overall control operations of the diagrams of FIGS. 12 to 14.

This valve determines whether the system is supplied from front pump P, rear pump Q, or both, and in addition is a relief valve for determining the maximum pressure of the front pump when it alone supplies the system and the maximum pressure of the system when supplied by both pumps or by the rear pump alone. Provision is made for changing the range of pressure, that is increasing the maximum value of the pressure of the system, when the gearing is shifted either to low or reverse. Therefore, each pump P and Q in combination with the regulator valve 150 constitutes a source of fluid under limited maximum pressure for supplying the control system, and has means for changing the maximum pressure with change of torque requirements. The source thus provides one range of control pressure for high, and a different range for low and reverse.

Referring to FIGS. 2 and 11–14, the valve 150 is fitted in a bore of casing 100*b*, and has an end portion *d* of relatively small diameter, and three bosses *e*, *f*, and *g* of relatively large diameter. The end *d* is loaded by spring 144 in space 145 connected by passage 146 to the valve 230 of FIGS. 12 to 14.

Low speed boost port 147 connects to passage 148, front pump supply port 149 to front pump feed passage 151 which connects to the front pump inlet inside the front pump check valve CV, port 152 to the sump 115' which constitutes the inlets of both pumps, converter supply port 153 to passages 23*b*, 168 leading to the working space of the converter W, and inlet port 155 is joined to line 156 connected to the pressure delivery space of the pumps P and Q between the check valves CV and CV'.

Valve 150 determines the ratio shift actuation pressure, and controls the shift of pressure supply from the front pump P to rear pump Q. Bleed hole 157 connects the spaces on either side of boss *g*.

When there is no pressure in the line 156, which indicates that neither pump is working and therefore that the car is standing with the engine not running, the spring 144 holds the valve stem fully to the right so that land *f* of valve 150 closes the converter supply port 153 to prevent loss of fluid from the converter working space. Rise of pump pressure in line 156 (FIG. 12) is communicated through opening 157 to the pressure area formed by the right face of land *g* and this moves the valve stem to the left against spring 144 so that the position of the valve stem is a measure of the pressure. At a predetermined pressure the land *g* opens port 153 to fill the remaining converter space and build up the pressure in the converter. Since the pressure supply chamber connected to intake port 155 is always connected to the main line 255, as shown by FIGS. 12 to 14, the supply can be connected to any friction torque-establishing device at any time. A supply of liquid under pressure is therefore available to operate any friction torque-establishing device before liquid can be supplied to the torque converter, and in fact unless the pumps are furnishing the required normal operating pressure the port 153 is closed. This assures that there can be no flow to the torque converter which might inherently reduce the pressure of the main line which would reduce the torque transmitted by the friction torque-establishing device until after the friction torque-establishing device is applied with its normal operating pressure to produce its normal operating torque.

At another predetermined pressure the stem of valve 150 moves to a position slightly to the left of the position shown in FIG. 13 so that the land *e* cracks the port 149, which then vents to the sump any oil tending to produce excess pressure. Thus, if the front pump alone is operating, as it is in the reverse, as shown in FIG. 13, this limits the maximum pressure of that pump.

When rise of vehicle speed to a given value enables the rear pump Q to provide the required pressure and capacity, the valve 150 has moved so that band *e* opens port 149 fully to connect the output line 151 of pump P to exhaust part 152. For example, the pressure value at this stage could be 90 pounds p.s.i., entirely sufficient to operate the 1 to 1 drive clutch. The maximum pressure of the rear pump is limited by land *f* which cracks the connection between the exhaust port 152 and the space between lands *f* and *g* and relieves excess flow to the sump.

For practical reasons, it is desirable to use a higher pressure for operation of the low and reverse bands 50 and 55, therefore the force urging the valve 150 closed is boosted by pressure in the passage 146 and space 145 connected to the low servo valve port 235 of FIGS. 12 to 14, and operating on the pressure area of boss *d*; and for the same effect for reverse, pressure in passage 148 and port 147 is applied over the area of land *e*. This arrangement introduces an increased resistance to the motion of the valve 150 toward relief at port 152, such that a higher pressure is developed in the servo feed lines 79 and 148 before valve 150 can begin to relieve.

This higher level of pressure may be set at a value approximating 180 pounds p.s.i., by the design of the elements of the system.

In FIG. 2, the actual assembly detail of pressure regulator valve 160 of the fluid system is given as distinct from the schematic views of FIG. 11 and FIGS. 12 to 14. The plate section 100*g* is bored for the valve 150 and drilled for the porting, which is coordinated with the various passages of the fluid pressure system. The section 100*g* is fastened to housing section 100*i* by bolts or other convenient means, not shown. The valve portions are assembled by means of cap screws. The portion *d* of the valve is used as a piston for assisting the springs 144 in low gear drive. Pressure supplied by line 146 acts on both sides of spring retainer 144*a* and is only effective on the end of *d*. The check valve CV is assembled in plate 100*g* and seats on plate 100*h* and is connected to passage 221 and passage 222 for port 149. The oil flow from the front pump P feeds thru CV and enters port 155 between bosses *f* and *g*, and its pressure is effective at the left of boss *g* thru bleed hole 157, to oppose the springs 144 and urge valve 150 to the right. Under a given pressure and spring force, the port 153 connected to the converter feed lines 23*b* and 168, is exposed, as explained in connection with FIG. 11. One result of this is that a predetermined pressure is maintained in the main line 225 and any servo connected to it, before the port 153 can be opened to supply the converter. When boss *f* is shifted farther to the right in FIG. 2 to expose outlet port 152, the leakage to exhaust prevents the pressure from rising above a predetermined value. Reinforcing pressure for low gear and reverse band actuation is obtained by the admission of pressure to ports 146 and 147 respectively, as described further in connection with FIG. 11.

FIG. 12 is to show the operating characteristics of the control system for drive in low upon actuation of low brake band 50.

One or both pumps P, Q may supply port 155 of valve 150 connected to ports 232 and 237 of ratio shifter valve 230, now first described.

The shift control volve 230 of FIGS. 12 to 14 and 17 is fitted in a bore in casing section 100*b*, or a section adjacent thereto, and has four bosses *h*, *i*, *j* and *k* from left to right as shown. The casing is ported at 231*a*, 231, 232, 233, 234, 235, 236 and 237 from left to right.

The port 231 is connected to direct clutch supply passage 202 jointed to the inlet of the direct drive accumulator pilot valve 203, and to passage 139 and to port 138 of the low gear anchor valve 130.

The inlet port 232 and inlet port 237 are connected by main line 225 to port 155 of the pressure regulator valve 150. Passage 156 connects port 155 with the passage 226 forming the outlets of the valves CV and CV'.

The reverse supply port 233 is connected by passages 148, 148*a* with cylinder 92 of the reverse band piston 90, and to reverse boat port 147 of the pressure regulator valve 150.

Ports 231*a* and 234 are vents, leading to the sump.

The port 235 is connected by passage 135 with port 134 of the anchor valve 130 of FIGS. 9 and 10, and also by passage 148 leading to space 145 of the pressure regulator valve 150 of FIG. 11.

Port 236 connects by passage 141 with port 136 of the anchor valve 130 of FIGS. 9 and 10.

In low, as seen in FIG. 12, the left branch of main line 225 is closed at port 232 by land *i* and pressure is delivered from the right branch of 225 from inlet port 237 to ports 235 and 236, the latter delivering to passage 141 and thru ports 136 and 130*b* of valve 130 to line 133, acting in 202′ and 201′ to hold accumulator valve 200′ down, and in passage 79 leading to cylinder 69 for holding the low gear band 50 of FIG. 2 thru the force applied to piston 70.

The pressure of line 135 is cut off by boss *a* of valve 130 at port 134. Pressure in the selector valve is conducted by line 146 to the leftward face of boss *d* of valve 150, in space 145, to raise the line pressure maintained by the regulator valve as explained above. As noted above, the anchor valve 130 is movable under torque reaction to regulate the loading interval for band 50 and clutch 40–45.

Feed of pressure to maintain the converter (W) working space filled is provided by port 153, line 23*b*, meting orifice 223, and line 168.

Should road speed fall off, fall of line pressure maintained by the rear pump permits valve 150 to move to the right enough to close port 149 so as to introduce the pressure pump P to the line 156. But, when vehicle speed is high enough, it will be noted that the effective line pressure in 226, 156 from pump Q will hold valve CV on its seat, while front pump pressure in lines 221, 151 is relieved thru port 149 to drain port 152 between bosses *e* and *f* valve 150.

For reverse the valve 230 is placed as shown in FIG. 13 the boss *k* closing input feed port 237, cutting off the feed to low supply ports 235, 236, and pressure lines 135, 141 and 146, and venting them at port 234. Land *i* cuts off the left branch of main line 225 from clutch supply port 231 and vents the clutch line 202 at port $231_a$.

Pressure feed is delivered from passage 225 to port 232, across the valve space between bosses *i* and *j* to port 233 and to reverse servo lines 148, 148*a*, taking effect through port 147 behind land *e* to augment the force of spring 144 on pressure regulator valve 150; and is exerted in cylinder 92 to actuate reverse band 55 of FIGS. 1 and 3.

As before, the converter W is maintained under pump line pressure supplied by pump P thru check valve CV, line 156, port 155, line 23*b*, restriction orifice 223, and passage 168. The boss *e* of valve 150 closes port 149 and line 151 until the pressure of the front pump reaches its predetermined maximum.

It should be remembered that when shaft 60 is driven reversely, the rear pump Q, revolving backwards, would tend to drain the passage 226, except for check valve CV′, urged by pressure in line 226, as well as by its own spring to close, permitting pump P alone to supply the system.

Reference is now made to FIG. 17 where the ratio control valve 230 is shown. In this view it will be noted that the valve is stationed to the right of the high ratio position of FIG. 14, that is neutral.

Upshift from low to high is accomplished by ratio control valve 230 to the right from the position shown in FIG. 12, to that of FIG. 14. This causes the pressure which had been actuating the lower gear band piston 70 to be cut off at port 235 from line 135. The hand *h* cuts off exhaust port $231_a$ and land *i* connects port 232 to port 231, and line 202 leading to valve 203, to deliver pressure to passage 201 and passage 140 connected to cylinder 49 for actuating clutch piston 40. This pressure is also delivered to passage 139 and to passage 143, connected to ports 142 and 138 of anchor valve 130.

This vents the low gear boost chamber 145 at exhaust port 234, restoring the lower value of maximum pressure maintained by the regulator valve. Main line pressure is now supplied from the selector valve outlet port 236 through line 141 and the depressed anchor valve 130 (FIGS. 10, 12) to line 133 and low band apply servo 69 to retain the low band applied temporarily. When oil is supplied from the left-hand branch of the main line 225 through outlet port 231 of the selector valve to line 202 which leads to the high accumulator, it starts to apply the direct clutch as described above. A branch 139 leads from the line 202 to port 138 of the anchor valve 130 and out from the port 142 of the anchor valve to a line 143 which by-passes the accumulator and connects directly with the high clutch apply line 140.

As the direct drive clutch begins to take hold, it exerts more and more forward torque on the clutch drum 37, which is also the low brake drum, and which up to now has been held stationary by the low band 50. When the increasing forward torque of the clutch 40–45 exceeds the reverse reaction torque on the drum 37, the drum rotates the band 50 forward, which is counterclockwise as indicated by the arrow in FIG. 7, to release the torque valve 130 to the position shown in FIG. 9. When this occurs the torque valve connects to the low servo line 133 to line 135 which is now vented at port 234 of the selector valve 230, as shown in FIG. 14. This rapidly dumps the low servo 69 and releases the low band. At the same time the by-pass formed by lines 139 and 143 around the high accumulator is cut off by the torque valve and pressure is gradually built up in the clutch, as described above, through the low-rate passage formed by the orifice 207 in the check or pilot valve 203 of the high accumulator. This leaves the transmission in high gear.

To shift from high to low the manual valve is moved from the position of FIG. 14 to the position of FIG. 12 in which land *h* opens exhaust port $231_a$ to establish communication between port 231 and exhaust port $231_a$ and dumps the high clutch through line 140, port 201, past the check valve 203, which fully opens instantly, and line 202. At the same time, oil is supplied to the low servo lines 141 and 135, as described above, so that the servo 69 begins to apply the low band. Between release of the high clutch and the final full application of the low band there is a brief interval in which the transmission is not transmitting substantial torque. This allows the engine to speed up, as is customary when shifting to a lower speed ratio, or higher torque ratio. When the engine has speeded up to a point that fits car speed at the low ratio the engine starts to rotate the reaction drum 37 backward and this rotates the low brake band 50 to push the torque valve down. This changes the connections of the low band apply line 133 from line 141 to line 135.

The pumps P and Q supply fluid pressure for the transmission shift controls, the lubrication system, and maintain the converter (W) working space under positive pressure at all times when either the engine is running or the car is moving forward. The master pressure regulator valve 150 feeds the working space of the converter thru a meterinf orifice 223 and when both the car and the engine stop, the land *f* provides a cut-off action, to maintain the quantity of fluid in the converter against idle drainage to the sump 115′, which is located below the level of the converter.

Oil is supplied in the inter-rotor space, between the impeller blades 6 and the stator or reaction member 9, and outflow from the converter emerges in the inner radial zone between the driven turbine rotor 7 and the stator member 8. It is thought to be novel in this combination to admit the input working space fluid at a point where it is immediately subject to acceleration from a low to a high kinetic state. The converter rotation applies force to circulate this oil body without exepnsive and complicated injector and ejector means, providing sufficient velocity of motion to guarantee rapid movement thru the externally located coolers, yet avoiding fluid voids in the working space body by maintenance of positive pressure therein.

On the outflow side of this dynamic flow system, in the passage 165′ are located two relief valves 210 and 211, the first of which 210, is set to relieve at a given value, for example 50 p.s.i., its overflow going by passage 212 to the second relief valve 211, which may be set to relieve at a lower value, for example 15 p.s.i. The 15-pound space is connected by passage 213 to the transmission lubrication spaces, while the overflow of valve 211 relieves to the sump.

FIG. 16 shows the relative positioning of the cooler or heat exchanger in the fluid system.

The cooler C receives oil under pressure from the converter working space in pipe 165 and delivers it to pipe 165′. The valve 210 has a leakage hole 216 in its top center to permit a constant continuing quantity of flow toward the sump, and its upper face acts as a seal limited by the force value of spring 214. In a given design, this spring-and-valve combination would be set to permit full outflow at port 215 into space 212, under 50 p.s.i., in line 165′.

The valve 211 is exposed to the pressure of space 212 and relieves by yielding of spring 217, to spill the excess oil into the spent pressure passages 218 and 219 at a predetermined pressure, for example, of 15 p.s.i. The passage 213 leads to the various lubrication channels for the converter and gearing, to maintain same under positive pressure.

Orifice 223 serves to limit the amount of oil required by the torque converter so that the pump Q, which is of smaller capacity than pump P, can provide the system at a low car speed and relieve the larger pump P to prevent loss of power.

The function of orifice 223 of FIGS. 12 to 14 is to maintain a control circulation thru the converter W, avoiding excess flow thru the working space which could generate churning losses, also.

The valve 210 set at a given pressure level maintains a static level pressure in the working space of converter W, preventing cavitation. The valve 211 provides further staged regulation of the working space outflow, and gives a convenient point from which to tap for lubricant flow to the running parts, at outlet 213.

FIG. 15 is a part section taken at 15–15 of FIGURE 1. The output shaft 60 of the carrier 28 of the gear unit G is toothed externally at 170. The housing 100*d* is formed to provide a compartment. In this compartment the lever 175 is fixed to a shaft 173, and is equipped with a ball joint 176 coacting with rod 176′, ball-jointed to lever 177 on shaft 178, which lever is urged by the inward end of coil spring 185 against the stop 184. The lever 171 is toothed to match the teeth of the member 170, and may have one or more teeth. The lever 171 is rocked by arm 181, which is pivoted to lever 179 supported in the housing by the said shaft 178. The levers 179 and 177 are both fixed to the said shaft 178.

The lever 171 is pivoted at 172 to swing in an arc, to intersect the teeth 170 when urged by lever 181, and swings toward the ring of teeth 170 under clockwise rotation of lever 177.

The arrangement of the adjacent parts is clear by referrence to FIGS. 15 and 17, also 19. The control shaft 173 carries arm 175 for operating an extension rod 190 for valve 230 of FIG. 17.

The lever 174 actuates a parking brake by moving arm 171 into mesh with teeth 170. Should the tooth or teeth of 171 be rejected by movement of member 170, reaction motion of lever 174 indicates the fact to the operator and also stores energy momentarily in the spring 185.

Rocking of lever 174 to slide rod 190 to shift valve 230 of FIG. 17 permits ball-jointed rod 176′ to swing in a non-interfering arc with the lever 171 out of tooth contact with 170.

The rod 190 for moving valve 230 is operated by the mechanism of FIG. 15 and is shown in FIG. 17.

The angular positioning of lever 174 and lever 175 with respect to the ratio and parking controls corresponds with common poppet-position locating means in the linkage external to lever 174.

It is desired that the coordinating ratio valve and parking brake control be clearly understood. In the sectional view of FIG. 15, the construction of the mechanical system for operating the parking brake device includes the toothed member 170, splined on shaft 60 to be held from rotation by pawl 171 pivoted at 172 on the casing, and rockable to mesh with the teeth of member 170.

The cross shaft 173 is operated manually by linkage connected to external lever 174, and swings lever 176 carrying ball joint element 176 fitted into the end of rod 176′, ball-jointed to lever 177 on shaft 178.

Lever 170 is pivoted on shaft 178, is pivoted at 180 to piece 181, which is pivoted in turn at 182 to the toothed lever 171.

Rocking of cross shaft 173 so that the pivot end at 190 of lever 175 swings toward the eye of the observer causes rod 176′ to rise and swing the pivoted levers 177, 179 and 181 so that the alignment of pivots 178, 180 and 182, in net effect, performs like a toggle, causing toothed lever 171 to move into solid registry with the teeth of member 170. Spring 185 coiled around the pivot 178 has a projecting end tending to return this mechanism to the positions shown in FIG. 15, with lever 177 resting against stop 184.

The end of valve 230 of FIG. 17 is connected by rod 190 to lever 175, so that the overall ratio and parking brake control may be provided thru motion of external lever 174.

It should be noted that the sequence of operations for the described mechanism of FIGS. 15 and 17 transverses the valve 230 thru reverse, low, direct, neutral, and parking positions.

Rotation of the impeller I when rotor O is standing still forces the fluid of the working space from the inner radial zone to the outer radial zone of the converter, giving the fluid kinetic energy and forcing the fluid against the blades 7. The oil tends to flow around the section of the torus counter-clockwise as FIG. 1 is viewed, and thru the reaction rotors $R_1$ and $R_2$, the auxiliary impeller $I_a$ and to enter the interblade spaces of the impeller I, to repeat the sequence.

If rotor O could rotate at the same speed as impeller I, there would be no flow. The magnitude of the toroidal flow is always proportional to the differential of speed between O and I.

The core ring formed by the sections 101 to 105 guides the flow so as to avoid turbulence within the oil body, thus improving torque efficiency by preventing local surges and eddies in the toroidal stream.

The flow of oil in causing rotation of output rotor O imparts torque to the turbine output shaft 11. The reaction rotor blades 8 and 9 are so formed that the backward tangential component of flow from the exit of rotor blades 7 is reversed and converted to a forward velocity entering the blades of the impeller I.

The reaction rotors $R_1$ and $R_2$ are coupled by the 1-way brakes 16–14–15, 17–14′–15 so that they cannot rotate backward, hence affording a fulcrum means for the required reversal of the toroidal flow.

The kinetic energy remaining in the body of fluid delivered by the reaction rotors to the impeller inlet spaces is absorbed by the impeller blades to increase the energy eventually delivered by the impeller to the output turbine O.

At high differential speeds, the toroidal flow being greatest, the net energy so delivered is greatest, and the output rotor is at a lesser speed than the impeller. The result is torgue multiplication, which would be at maximum when the output rotor would be stopped or nearly stationary, and the impeller would be driven at maximum speed by the primary power source.

The reaction rotors $R_1$ and $R_2$ are capable of being driven forward when the reverse reaction forces applied by the toroidal flow diminishes to zero.

The reaction blades 8 and 9 are given predetermined, different angularities so that the rotor $R_1$ reaches the zero torque point before $R_2$, and rotates forwardly with output rotor O. The remaining reaction forces resulting from the differential speed relationship noted above, are then taken by the blades 9 of reaction rotor $R_2$, until the reaction force on $R_2$ in turn, dies out, whereupon $R_2$ begins to rotate forwardly.

The auxiliary impeller $I_a$ has its blades, and the 1-way clutch 18–19–20, so arranged that when the rate of toroidal flow is relatively high with respect to the absolute speed of the impeller, the rotor $I_a$ may rotate forwardly faster than the impeller I, and thereby relieve the flow of a portion of the losses. The rotor $I_a$ spins forward freely during the drive interval of high torque, its blades 6 guiding the toroidal flow into the inlet zone of the impeller blades for avoidance of undesired turbulence at high toroidal flow velocities.

These characteristics are merged so that an overall acceleration from maximum torque multiplication to nearly 1-to-1 drive between shafts 1 and 11 takes place. It should be understood that the drive combination of the invention is particularly adapted for fluid torque converters of the type which have an operating range from reduction ratios thru a range of diminishing torque multiplication to nearly 1-to-1 coupled ratio. In actual practice, one form of converter of the present invention may reach its minimum slip at vehicle speeds above 30 to 35 miles per hour.

Reviewing the operating sequences, in the diagrams of FIGS. 12 to 14, the active pressure lines are shown in full line, and the inactive lines in dashed line. The front pump P is shown as driven by the part 4 of FIG. 1, and the rear pump Q driven by output shaft 60. In the lower center of these diagrams a single pressure feed pipe 156 is shown connected to outlet passage 226 of both check valves CV and CV′, and the lines 221 and 220 connect the pumps P and Q to the inlets of the respective check valves.

The upper leg 156 of the check valve outlet passage 226 is joined to the port 155 of the pressure regulator valve 150. Passage 220 from the rear pump Q is connected to the inlet of the valve CV′, the pumps operating individually or jointly to provide the system with fluid pressure under all drive conditions. Annular port space 149 of the valve 150 is connected by passage 151 leading from the outlet of the front pump only.

Pump Q supplies no pressure when the vehicle is stopped, and pump P driven by the engine, supplies pressure to unseat valve CV and admit pressure to passages 226 and 156.

The ratio control valve 230 has two pressure input ports 232 and 237, and vents at ports 231*a* in the open space to the left of land *h* and at port 234. The delivery ports 235, 236 direct the fluid pressure to establish low gear drive. Port 233 provides for reverse, and port 231 provides direct drive. Port 153 supplies the working space pressure for the converter W thru passages 23*b* and 168, and orifice 223.

Passages 141, 133, 79 supply the low ratio brake cylinder 69, and passages 202, 139 and 140 lead to the direct clutch cylinder 49 between the seals 46 and 47 inside the drum 37. Passages 148, 148*a* lead to the reverse brake cylinder 92.

FIG. 12 shows the low gear range drive position, and conditions of these pressure control elements, FIG. 13 those for reverse drive and FIG. 14 for direct. In these diagrams the clutch feed line 140 is equipped with check valve 131 for admitting air to the line whenever the line is vented by the manual valve 230; and a second check valve 137 is shown mounted in the clutch piston 44, the latter relieving the oil which otherwise would be trapped, and under the action of centrifugal force would generate pressure causing the clutch to drag, should the clutch be disengaged at high speeds of the clutch members. Valve 137 is seated by pressure exerted by plates 40–45.

The linkage of FIG. 19 connects the vehicle steering-column control head for the gear drive assembly with the cross-shaft 173 of FIGS. 1 and 15.

Lever 174, outside, fixed external of the casing, is fixed to shaft 173 and is pivoted to rod 265 in turn pivoted to the long arm of a bell-crank lever 264, pivoted on the casing or frame construction. The short arm of the bell-crank lever 264 is pivoted to link rod 263 which is bent at 90 degrees into a pivot hole, in the arm 262 rotated by control shaft 258 of FIG. 20.

The control shaft 258 is mounted inside the steering column 256 and has only rotational motion.

The shift control mechanism is arranged so that the driver by grasping the handle 250 will know of the positional steps, and so that the devices inside the gearbox will be always exactly stationed for the several ratio station positions. For these purposes poppet mechanism is provided, to be operated by the rotation and axial motion of the main control shaft 258.

The poppet mechanism of FIGS. 20 and 21 consists of carrier piece 269 for spring-loaded poppet 270 which intersects the poppet plate 271 shown in arcuate form in FIG. 21. The five poppet stations correspond to the five positions of the valve 230 of FIG. 17. The poppet carrier is attached to arm 262 of shaft 258. When handle 250 rotates hollow shaft 258 of FIGS. 20 and 21, the arm 262 rotates the poppet carrier 269, the poppet 270 ratcheting over fixed plate 271, resisting the motion at the five cam positions shown.

The master operator control handle 250 of FIG. 20 is supported in fitting 251 and has a ball joint 252, the inner end of handle 250 engaging plunger 253 urged by spring 254 to project a pin at the end of the plunger into guide recesses 255 formed under the sector plate 257. The handle 250 has limited rocking motion in planes including the axis of the steering column 256, and also rotates the shaft 258 by the fitting 251. The pointer 261 is fixed to the fitting 251, and moves under the transparent or translucent window marked "P.N.D.L.R." of the sector plate 257, in FIG. 22.

The lower end of the shaft 258 is fastened to arm 262 of FIG. 20 pivoted to bent arm 263, the other end portion of which pivots in the short arm of bell-crank lever 264.

Referring back to FIG. 19 it will be seen that lever 264 is supported on the frame, and is pivoted to rod 265 pivoted to the arm 174 of shaft 173.

The handle 250 is arranged to have sector motion so that its stations will appear on the indicator sector 257 of FIG. 22 which is marked "P-N-D-L-R."

The handle 250 has planar or vertical motion so that it may be lifted for establishing the shift to reverse.

The pin of sliding plunger 253 may travel freely from positions "P" to "L," but it encounters stop 255 under the sector plate 257, requiring the handle 250 to be lifted as shown, for retracting the plunger bolt 253 against spring 254, to get into "R" position, for establishing reverse drive.

The arrangement prevents accidental shift to reverse, the stop action of plunger 253 preventing further movement until the plunger is retracted. The stop 255 may also be used to establish a similar dwell during shifting from reverse to forward.

The described dwell-compelling mechanism located in the steering column control head is related to the positions of the poppet 270 and plate 271 of FIG. 21, and once properly calibrated, this mechanism stays put. Similarly, the follower motions of the rods and levers of FIG. 19 are coordinated with the positioning of the ratio control valve 230 of FIGS. 12 to 14 and 17, and the parking brake mechanism of FIG. 15, so that each of the stations of the pointer 261 over sector plate 257 of FIG. 22 corresponds exactly to the established control action.

The station positions for the master ratio control valve 230 are shown in FIGURES 12, 13, 14 and 17 by the notations "N," "Low," "Rev." and "High," the fifth station PK in FIG. 19 being for the parking brake setting. The valve 230 continues to block the feed ports 232 and 237 as in neutral, and the travel range of the valve 230 to the parking brake station is merely to provide sufficient motion for the required operation of the construction shown in FIG. 15.

The cooler C of FIG. 16 is located between passages 165 and 165'. The torque converter W during normal operation generates a variable pressure in the oil of its working space. The detail of the cooler construction is not shown but the invention contemplates restricted cooler passages to assist in stabilizing the flow of working space fluid against fluctuations caused by oil temperature variations and by surges in converter generated pressure. The pump system, controlled by pressure regulator valve 150 provides a reasonably steady flow, to the converter working space.

In view of the above detailed description of the operations, it is not deemed necessary to repeat them in detail. After starting the vehicle engine, with the handle 250 of FIGS. 20 and 22 moved so that the pointer 261 indicates neutral, the handle is then normally moved to drive, position "D" of the sector plate 257, which will cause the poppet 270 to move into the position shown in FIG. 21 as shaft 258 is rotated, this motion being transferred to lever 174 of FIG. 19, which is stationed as shown in that figure. For all normal driving purposes this simple operation serves to couple the direct drive clutch 40–45 of FIG. 1 so that the torque converter W drives shaft 60 automatically at variable speed ratio.

When it be desired to shift to low gear, and actuate band 50 to esetablish sun gear 35 as the gear reaction member, the handle 250 is moved freely to the position "L," which shifts the ratio control valve 230, so as to establish the fluid pressure conditions described in connection with FIG. 12. If it be desired to shift freely between low and reverse, all the operator is required to do is to lift the end of the handle 250 while it is being moved to station the pointer 261 at the extreme right position of FIG. 22, this operation establishing the fluid pressure conditions described in connection with FIG. 13. The handle 250 may be used for maneuvering a car out of a space where traction is uncertain, with facility.

The engine may be started with the handle in either neutral or parking position, since there will be no drive of the vehicle by the torque converter until the gear unit G establishes a driving couple with the output shaft 60. It will be noted that in making the hand shift from direct through neutral to the parking position, it is necessary to lift the handle slightly in order for the pin end of the bolt 253 to clear one of the stops 255. This feature serves to warn the driver whose attention may be otherwise diverted from the sector plate and pointer 261, so that the driver will be aware of the position of handle 250 by feel.

The overall advantage of the present invention is the extraordinary facility provided the car driver for obtaining completely smooth acceleration from standstill to approximate 1-to-1 drive, without torque interruption, as well as the ability to change from one driving range to another during such acceleration, and with the drive mechanism so controlled that there is no effective interruption of the drive during such shift transition from either range to the other. Further advantages provided by the construction and the combinations embodied herein are likewise obtained in the extra facility for changing the drive between forward and reverse, and for actuating a parking brake by the same mechanism utilised by the driver for controlling the other drive conditions.

It is not believed that heretofore in this art there has appeared a torque converter and gear drive combination which possessed the ability to permit full torque shift between two driving ratio ranges over the complete scale of torque converter drive ratio extending from initial reduction to approximate 1-to-1 top ratio, with the facility for free choice between the two ranges by the driver.

The application of the invention may obviously take many forms, and therefore, while this specification has described and illustrated one practical and useful embodiment of the combinations of the invention, it is to be understood that the invention is in no way limited to the constructional details given herein, and that the invention may be varied within the scope of the following claims.

I claim:

1. In a liquid pressure actuator device for a variable speed ratio transmission or the like, a clutch housing supported for rotation about its axis and having a fluid pressure chamber, a piston in said housing adapted to be urged in one direction by pressures of the liquid in the chamber, a release spring adapted to urge the piston in the opposite direction, friction clutch elements associated with said housing and pressed together on movement of said piston by liquid under pressure in said chamber, a passage extending through a wall of said chamber adjacent the periphery of said chamber, and valve means controlling release of liquid from said chamber through said passage, said valve means being governed by movement of said piston so as to close said passage on movement of said piston against said release spring and to open said passage on movement of said piston by said release spring.

2. A pressure actuator as described in the claim 1 and in which there is a control passage communicating with said chamber and through which liquid under pressure may be supplied to and released from said chamber, said control passage communicating with said chamber adjacent the radially innermost portion thereof, a communication between said control passage and the atmosphere, and a check valve controlling said last-named communication so as to prevent flow of liquid from said control passage and to permit flow of air to said control passage.

3. In a transmission, an input member, an output member, planetary gearing for selectively establishing two driving speed ratios from the input member to the output member, a clutch for establishing one ratio, a brake for holding a reaction member to establish the other ratio, fluid pressure actuator for said brake and clutch, a valve for selectively controlling the supply of fluid under pressure to, and the release of fluid from said actuators, an orifice in the connection between said valve and one of said actuators for limiting the rate of supply of fluid under pressure to said one actuator, and valve means operative in response to torque reaction on said brake member in excess of a selected amount to establish a communication extending around said orifice through said connection.

4. In a power transmission, an input member, an output member, a friction torque-establishing device for establishing a driving connection between members, a fluid pressure actuator for said device, a control passage through which fluid under pressure may be supplied to said actuator, and means for regulating the rate of change in the pressure of the fluid in said actuator, said means comprising an orifice in the passage for limiting the rate of flow of fluid through said control passage, a by-pass conduit around the orifice, a chamber connected to said passage between the orifice and the actuator in which there is slidable a piston subject to the opposing forces of a spring and of pressure of fluid in said chamber, said piston being urged by said spring to open the by-pass and being movable against said spring to close the by-pass in response to pressure in the chamber.

5. A transmission as described in claim 4, in which there is a second by-pass around said orifice, a check valve in the second by-pass operative upon the fluid outflow from said actuator to open the second by-pass.

6. In a power transmission, an input member, an output member, a friction device operative in accordance with the pressure of the fluid in a chamber to establish driving connection between said input and output members, a control passage through which fluid under pressure may be supplied to and released from said chamber, a control valve selectively operative to connect said control passage to a source of fluid under pressure and to exhaust, and means for regulating the rate of flow of fluid to and from said chamber through said control passage, said means comprising an orifice limiting the rate of flow of fluid through said control passage, a first valve operative on a selected increase in the pressure of the fluid in said chamber to cut off supply of fluid to said chamber through a first by-pass extending around said orifice, a check valve operative to permit fluid to flow from said chamber through a second by-pass extending around said orifice, and an accumulator connected with said control passage at a point intermediate said orifice and said chamber.

7. A transmission as described in claim 6 and in which the accumulator comprises a variable capacity container having a movable wall positioned by the opposing forces of a spring, and of the fluid in the portion of said control passage intermediate said orifice and said chamber.

8. In transmission ratio controls for fluid-pressure actuated change speed gearing, driving and driven shafts, the combination of a gear unit including forward and reverse drive gearing connecting said shafts and having a plurality of individually energized actuators for establishing selected gear ratios of said unit, a fluid pressure supply system including a plurality of pumps driven by said shafts and adapted to furnish fluid pressure for said actuators, said forward and reverse drive gearing of said unit being made operative by said actuators, a master control valve operative to distribute the fluid pressure of said system selectively to said actuators for providing said forward and reverse drives, a casing for said gearing, a shifter shaft in said casing adapted to move the said valve, an external lever on said shaft, a vehicle steering column and a ratio control shaft supported therein for rotational motion, mechanical connections between said control shaft and said lever for transmitting the rotational motion of said control shaft to said casing-mounted shifter shaft for moving said master control valve to predetermined inoperative and pressure delivering positions for energizing selected ratio actuators, a control head member mounted on said column and connected to rotate said control shaft, an operator handle supported in said head for rotating said control head and shaft and for limited rocking motion in the axial plane of said control shaft, and stop mechanism operative to permit a range of free rotational motion of said head but preventing same for a predetermined positioning of said handle except the handle to be moved in the direction of said rocking motion.

9. In the combination set forth in claim 8, the subcombination of a brake member for said driven shaft, and a cooperating member for holding said brake member, a linkage between said cooperating member and said shifter shaft arranged to render same operative to hold said brake member, and an arrangement of said handle, said control shaft, said connections, and said shifter shaft, operative for a given position of said handle when said valve is inoperative, to so hold said cooperating member.

10. In the combination set forth in claim 8, the subcombination of a poppet mechanism connected to said control shaft, for establishing a rotational series of dwell positions for said handle and said control shaft, and a movable stop for the said handle and control shaft requiring rocking of said handle for shift of the poppet mechanism to an end dwell position of said handle.

11. In a fluid pressure ratio-changing system for power transmissions having driving and driven shafts, a plurality of members actuable for establishing a range of forward and reverse speed ratio drives, a plurality of fluid pressure actuators for said members, individual actuator feed passages for each of said actuators, a plurality of fluid pressure supply passages, a fluid pressure control arrangement consisting of a valve casing having inlet ports connected to said supply passages, a plurality of delivery ports connected to said feed passages, and a plurality of exhaust ports, and a master ratio control valve located in a bore in said casing, and movable to provide individual delivery of the pressure supplied said inlet ports to each of said delivery ports connected to said actuator passages while connecting all other of said delivery ports to said exhaust ports; the arrangement of said valve with respect to the said ports being such that in one position of the valve the said plurality of inlet ports are blocked, and said delivery ports are connected to said plurality of exhaust ports.

12. The combination set forth in claim 11 having a parking brake mechanism including a locking member actuatable for holding said driven shaft from rotating, a controller effective to move said control valve and adapted to set the locking member to hold the driven shaft when said valve is set in another position in which the valve continues to block said inlet ports, while exhausting said feed ports.

13. A power gear unit including a direct drive clutch for connecting two of the gear unit members, a piston-and-cylinder forming a clutch actuator, a reaction brake for one of said members operative to establish low gear drive by said unit, a piston-and-cylinder actuator for said brake, a first pressure feed passage for said clutch-actuator cylinder, a second pressure feed passage for said brake-actuator cylinder, a pressure control device in said first passage operative to provide rapid filling of said clutch-actuator cylinder and to provide rapid venting thereof, a pressure control device in said second passage for said brake-actuator cylinder, a master control valve movable selectively to deliver fluid under pressure to one of said passages while venting the other passage, and a torque-responsive control mechanism, responding to the torque reaction of one of said gear unit members and connected to said passages, automatically effective to regulate the transition from drive determined by pressure supplied by said valve to one of said passages, to drive determined by pressure supplied to the other of said passages.

14. The combination set forth in claim 13, having an accumulator valve normally biased by a spring, and connected to one of the said cylinders for permitting rapid filling flow thereof from the said control valve, and movable by the pressure developed in said cylinder to restrict the said flow, and a pilot valve and spring, responsive to said developed pressure, operative to augment the release of fluid from said cylinder when said control valve is moved to connect one of said cylinders to exhaust.

15. The combination set forth in claim 13, having one end of said reaction brake movable by said brake piston, and the other end thereof resiliently supported for anchor reaction by a torque-measuring valve and spring, with porting for said valve, to constitute the said torque-responsive control mechanism, and passages connecting said torque-measuring valve with said first named feed passages such that the aforesaid transition control is made effective.

16. In fluid pressure-actuated controls for step-ratio gear units, a gear unit coupling driving and driven shafts, a reaction brake for said unit having one end thereof actuated by an actuator piston, and a movable anchor end, a 1 to 1 coupling clutch for said unit having an actuator piston, cylinders for said pistons connected to two fluid pressure feed passages, a valve normally raised into abutment with said brake anchor end by a spring of predetermined force, porting for said valve connected with said feed passages and operative to control the rise of pressure in one passage thereof while controlling the release of the pressure in the other of said passages in accordance with the reactive force exerted on said spring by said brake anchor end, and a master control valve for selective delivery of fluid pressure to said passages operative to initiate the action of said first-named valve by such selective delivery.

17. In power transmission controls for selective change speed drive between a driving and a driven shaft, step-ratio gearing driven by said driving shaft for driving said driven shaft at one of two selected forward speed drive ratios, a step ratio determining element for said gearing subject to the torque reaction thereof, and adapted to establish drive in one of said ratios, a coupling clutch adapted to establish drive in the other of said ratios, fluid pressure actuators for said element and said clutch, and fluid pressure operated mechanism controlled by the torque reaction of said step ratio determining element for controlling the operation and the gradual application of force to an actuator.

18. The combination set forth in claim 17, having fluid pressure pumping means, valving for directing fluid from the pumping means selectively to said actuators, and an arrangement of said pressure-operated mechanism and said valving effective to cause said mechanism to control the operation of said actuators during predetermined selective shifts of said valving.

19. The combination of claim 17, having fluid pressure pumping means operated by said shafts, controllable valving adapted to direct the pressure of said means selectively to said actuators, an arrangement coordinating the operation of said mechanism with that of said valving for timing the actuation of said actuators, and fluid pressure accumulator devices for controlling the rates of actuation of said actuators during the intervals of actuation of the said actuators for establishing either of said ratio drives.

20. A transmission comprising in combination driving and driven members, a torque-establishing device having friction elements adapted to be engaged to establish a driving connection between said members, a cylinder and a piston adapted to engage said elements, a fluid pressure delivery passage leading to said cylinder, a fluid pressure supply passage, a movable pressure-directing valve for selectively connecting said supply passage to said delivery passage and to exhaust, and an accumulator valve device made operative by pressure in delivery passage effective to permit initial rapid filling of said cylinder at a predetermined pressure, and to reduce the rate of increase of pressure in the cylinder thereafter to establish a pretermined final pressure and corresponding torque capacity of said friction torque-establishing device.

21. The combination set forth in claim 20, having pressure-responsive valving included in said accumulator valve device and effective to provide the stated rapid filling of said cylinder, and the following reduced rate of increase of cylinder pressure, and further effective to exhaust the fluid of said cylinder rapidly, when said pressure directing valve is moved to disconnect said passages.

22. The combination set forth in claim 20, having a torque-sustaining reaction element adapted to move variably with changes of torque ratio between said members, and a torque responsive valve moved by said element, and connected to said delivery passage, for controlling the interval of pressure delivery to said cylinder.

23. The combination set forth in claim 20, having pump means driven by said members for supplying said supply passage, a ratio determining element in said drive mechanism adapted to move with changes of torque ratio between said members, a fluid pressure actuator for said element adapted to be supplied with fluid by a delivery passage from said control valve when said control valve is exhausting said supply passage, and a pressure-responsive valve subject to the pressure of said pump means, and subject to reactive pressure of said element actuator delivery passage, for regulating the supply pressure of said supply passage when the said control valve is operative to supply the said actuator for said element.

24. In power controls for a step-ratio transmission adapted to connect a driving and a driven shaft, the combination of pump means driven by said shafts, fluid pressure actuators for determining reverse, low, 1 to 1, and neutral drive, a control valve adapted to direct fluid pressure selectively from said pump means to said actuators, a parking brake mechanism adapted to lock said driven shaft against rotation, a control shaft for said transmission operative to move said valve to reverse, low, 1 to 1, and neutral positions, in this stated sequence, and further operative to move said mechanism to lock said shaft against rotation in a further position of said valve sequentially beyond said neutral position, a lever attached to said control shaft, a manual control device for said control shaft embodying a handle connected to said lever and movable to said reverse, low, 1 to 1, neutral, and parking positions, and yieldable holding apparatus operative upon said control device to provide yieldable positions for the said handle corresponding to the stated positions of said control shaft and said control valve, a mounting for said handle permitting rotational motion thereof sequentially to the stated positions, and permitting limited rocking motion thereof, and position stops between low and reverse, between neutral and 1 to 1, and between neutral and parking brake positions, requiring rocking motion of said handle for continuing of the said rotational motion to the said positions.

25. A power transmission including a fluid torque converter driving a change speed gear unit, a fluid working space in said converter, fluid pressure actuators for said unit, a ratio control valve for said actuators, a plurality of supply pumps, a regulator valve casing connected to said pumps, a regulator valve movable in said casing, a regulator valve spring, a relief passage in said casing, a pressure regulator space in said casing arranged to provide pressure to oppose the force of said spring, a feed passage connecting said regulator space with the said pumps, the spring force and regulator space pressure determining the pressure in said regulator space, a pressure delivery passage leading from said regulator space to said ratio control valve, a second delivery passage leading from the regulator space to said working space of said torque converter, and pressure control means connected to said second delivery passage and controlling the flow of fluid through the said working space, such that a drop in the working space pressure below the normal regulated operating pressure determined by the force of said spring prevents said regulator valve from relieving by said relief passage, until the said pumps furnish the required normal operating pressure.

26. In fluid-pressure-actuated speed-ratio changing devices, a ratio-determining element, an actuator for said element including a piston in a cylinder connected to move said element against a disengaging spring, a fluid pressure delivery passage, a fluid pressure cylinder passage, a valve casing, an accumulator valve in said casing having a fluid flow space and a pressure-area head, a spring arranged to hold said valve in a position to connect the feed of said first-named passaged with the said cylinder passage, and adapted to yield when said cylinder is filled by virtue of the pressure on said head, a pilot valve in said casing adapted in one position to connect said first named passage with said accumulator valve flow space, and adapted to be subject to the pressure of said cylinder passage, to move to a second position for by-passing said flow space, a spring for said pilot valve tending to hold it in the first position, and a control valve adapted in one position to deliver fluid pressure to said first named passage, the accumulator and pilot valves permitting initial rapid filling, and final gradual rise of pressure in said cylinder for actuation of said element by said piston, the control valve being adapted in another position to vent said accumulator and cylinder, the accumulator and pilot valves being adapted to permit rapid exhaust of said cylinder.

27. A variable speed power-transmission mechanism for motor vehicles comprising, a gear unit having a clutch and a torque-sustaining reaction brake for obtaining different driving ratios, fluid pressure actuators for said clutch and brake, a control valve adapted selectively to direct fluid under pressure and a second valve responsive to brake-torque reaction operative to control the rate of admission of fluid to the clutch actuator when the control valve is positioned to release the brake actuator pressure and direct fluid to the clutch.

28. A variable speed power-transmission mechanism for motor vehicles comprising in combination a gear unit, a fluid pressure pump; clutch and a torque-sustaining reaction brake for obtaining different speed ratios, fluid-pressure actuators for said clutch and said brake, a pressure-control accumulator for said clutch actuator, a ratio control valve adapted selectively to direct fluid under pressure to the actuators, a valve responsive to brake-torque reaction and operatively between the accumulator and the control valve to control the rate of increase of pressure in the clutch actuator when the control valve is positioned to release the pressure of said brake actuator and cause the clutch to engage.

29. A variable speed power transmission according to claim 27 in which the brake device includes a band having a reaction-sustaining anchor end, said torque-responsive valve comprising a spring-pressed plunger movable by the anchor end of the brake band so as to control the admission of fluid pressure feed to the clutch, and to cut-off pressure to the brake, as the spring pressure moves the plunger, with release of brake torque after the control valve is moved to engage the clutch and release the brake.

30. A variable speed power transmission mechanism according to claim 28 in which said pressure-control accumulator is operative to effect a rapid filling of the corresponding actuator, and to provide a gradual rise of pressure thereafter, and porting associated with the accumulator operative to provide rapid venting of the corresponding actuator.

31. A variable speed power transmission mechanism according to claim 28 in which the accumulator comprises a spring-biased plunger valve subject to back pressure of the active actuator cylinder to restrict the flow thereto, and a spring-pressed pilot valve responsive to admitted pressure, and operative to regulate the flow, to produce a gradual rise of pressure after the plunger valve has restricted the flow following the initial rapid filling.

32. A variable speed power transmission mechanism according to claim 31 in which the pilot valve comprises a plunger having two ports, a fluid pressure chamber and a stop, one of said ports allowing restricted throughflow, and the other port admitting pressure to the chamber to assist the spring in urging the plunger against said stop.

33. A variable speed power transmission mechanism according to claim 28 having located between the control valve and the pressure pump a connection including a pressure regulator valve operative at one position of the control valve to maintain the pump pressure at one predetermined value, the regulator valve having a fluid pressure chamber connected with the control valve adapted at another position of the control valve to maintain a different pump pressure.

34. A variable speed power transmission mechanism according to claim 33 in which the pressure regulator valve comprises a plunger urged in one direction by a spring and having a chamber to which pump pressure is admitted to urge the plunger against the force of the spring, a relief port adapted to be opened by the plunger on predetermined movement against the spring, a second chamber associated with the spring, said connection with the control valve being operative to admit pressure to the second chamber, in one position of the control valve to assist the spring and increase the pressure required to open the relief port.

35. A variable speed power transmission mechanism according to claim 28 in which a fluid torque converter is combined with the gear unit, said converter comprising a two-part impeller, a rotor, and a two-part reaction rotor, the fluid being introduced into the converter working space from the pressure source at a point between the second reaction rotor and the adjacent first impeller.

36. A variable speed power transmission mechanism according to claim 28 in which a fluid torque converter is combined with the gear unit and housing, an output flow passage leading from said converter, output flow control valves located in said passage, said valve being arranged to deliver the spent pressure from said converter to a sump, and a lubrication connection joined to said outflow passage to provide lubrication pressure to said power transmission mechanism.

37. A variable speed power transmission mechanism comprising the combination of a hydraulic torque converter and an epicyclic gear unit equipped with fluid pressure actuators, a common pressure supply source for said converter and said actuators, control valving operative for maintaining fluid pressure in the working space of said converter at a given pressure, and supplied from said source, lubrication delivery passages connected to said space and to said source, a plurality of pressure delivery passages for said actuators, said latter passages being supplied from said source, selector valving operative to select the delivery of said pressure to said actuator passages for the purpose of establishing a plurality of forward drive ratios by said mechanism, one of said ratios being one-to-one and another ratio being less than one-to-one, and pressure regulator valving for providing a plurality of selective line pressures for said actuators, said last-named valving being operative to provide a high pressure during drive at less than one-to-one, and to provide a lower pressure during one-to-one drive.

38. In transmission ratio controls for fluid pressure-actuated change-speed gearing, the combination of a plurality of individually energized actuators for establishing selected transmission ratios of a step-ratio gear unit, a fluid pressure supply system adapted to provide fluid pressure to said actuators including a pressure regulator valve effective to maintain a predetermined ratio-actuating line pressure, a master control valve movable to select delivery of fluid at said predetermined line pressure to said actuators, a driven shaft, a brake element rotating with said shaft, brake mechanism cooperating with said element for holding said element and said driven shaft against rotation, manually operable control apparatus connected to said control valve and said mechanism, and a movable controller for said apparatus arranged to provide a range of selection of ratio actuation through sequential movements of said master control valve in accordance with a given movement of said controller during which ratio selection range said driven shaft brake mechanism connection is inoperative to cooperate with said brake element, and is operative to provide an exclusive and selective holding operation of said brake mechanism upon said brake element at one end position of said valve and controller movement wherein said valve is inoperative to select delivery of fluid pressure to said actuators.

39. In power transmission controls, a driving and a driven shaft, pump means driven by said shafts, a step-ratio transmission coupling said shafts equipped with a fluid pressure system supplied by said pump means and including ratio actuators responding to fluid pressure for determining reverse, low and 1 to 1 drive and providing no drive when relieved of pressure, a control valve adapted to direct fluid pressure selectively from said pump means to said actuators to make said reverse, low and 1 to 1 drive effective, a parking brake mechanism adapted when applied to lock said driven shaft against rotation, a control shaft for said transmission control valve and said brake mechanism operative to move said valve to reverse, low, 1 to 1 and no drive positions, and further operative to apply said brake mechanism to lock said driven shaft against rotation in a further non-active position of said valve beyond said selecting range, a lever attached to said shaft, an operator-operated control device for said control shaft embodying a settable handle connected to said lever and movable in said range of reverse, low, 1 to 1 and no drive positions, and to said parking brake position, and position-determining apparatus operative upon said device yieldably to hold said handle in position corresponding to the stated positions of said control shaft and said control valve.

40. In fluid pressure actuation systems for change speed transmission drives, driving and driven shafts coupled by a change-speed transmission equipped with fluid pressure ratio actuators, a drive control valve for selective feeding of fluid pressure to said actuators, a first pump driven by said driving shaft, a regulator valve casing, a second pump driven by said driven shaft, individual pressure delivery passages for both said pumps leading to said casing, a pressure-responsive pressure-regulator valve in a bore of said casing and adapted to move axially therein, connections between said passages and said bore, a pressure delivery passage leading from said regulator valve casing and said bore to supply said control valve, a relief passage connected to said bore arranged to vent the pressure delivery passage from said first pump upon initial motion of said regulator valve in response to pressure, a spring operative to press said valve axially in one direction opposing said pressure and thereby tending to close the said relief passage, a port in said valve casing connected to the combined output of both said pumps, and an arrangement of said port with respect to the said relief passage which upon further motion of the regulator valve in the direction to compress the said spring provides connection between said port and said relief passage.

41. In the combination set forth in claim 40, the subcombination of check valving located in said pump delivery passages connecting the pumps with said pressure spaces, and effective to cut off the supply of said first pump at a given variable speed of said second pump indicative of its ability to furnish adequate fluid pressure capacity to said control valve and to said actuators, said check valving being operative during backward rotation of the said second pump, to interrupt the delivery passage connection of the last-named pump to its respective pressure space.

42. In a power transmission, an expansible chamber motor operating a friction device establishing a driving connection between an input member and an output member, a conduit for admitting fluid under pressure to the motor, and means for controlling the admission of the fluid to the motor including a restricted passage in the conduit which permits only a relatively slow flow of fluid to the motor, a by-pass around the restricted passage adapted to admit fluid rapidly, an accumulator chamber connected to the conduit between the restricted passage and the motor, and means responsive to a predetermined rise of pressure in the accumulator for closing the by-pass.

43. In combination, a rotatable cylinder, a piston in the cylinder, a coupling operated by the piston, means for introducing fluid under pressure into the cylinder to operate the coupling, said pressure being releasable to render the coupling inoperative, and means for substantially emptying the cylinder of residual fluid when the pressure is released, said last-named means comprising a bleed opening in the piston, means for closing the bleed opening upon partial operation of the coupling, and a pressure differential operated valve in communication with the pressure fluid on one side and with atmospheric pressure on the other, said valve being adapted to admit air into the fluid introducing means when the fluid pressure falls below atmospheric.

44. In combination, a rotatable cylinder, a piston in the cylinder, a coupling operated by the piston, means for introducing fluid under pressure into the cylinder to operate the coupling, said pressure being releasable to render the coupling inoperative, and means for substantially emptying the cylinder of residual fluid when the pressure is released, said last-named means comprising a bleed opening in the piston, means for closing the bleed opening upon partial operation of the coupling, and a non-rotating pressure differential operated valve in fluid communication with the cylinder and with the atmosphere and adapted to admit air into the cylinder when the pressure in the cylinder falls below atmospheric pressure and to close when the pressure in the cylinder exceeds atmospheric pressure.

45. The combination described in claim 44, said non-rotating pressure differential operated valve comprising a ball check valve.

46. In fluid pressure control systems for variable speed ratio drives, in combination, a clutch including a rotatable housing containing a piston in a fluid pressure chamber, friction elements pressed together on movement of the piston by fluid pressure in the chamber, and a clutch release spring which opposes force of the piston on the friction elements; means for supplying liquid under pressure to the chamber to exert force on the piston to press the friction elements together; a passage which conducts fluid from the chamber through the piston adjacent the periphery of the chamber; and a valve on said piston, which valve is moved to close the passage by force of the piston when pressing the friction elements together and which valve is moved to open the passage by pressure of liquid in the chamber after removal of supply pressure on said liquid; a fixed housing supporting the rotatable housing, a conduit in the fixed housing connecting the pressure chamber and the liquid source, control means for either directing pressure from the source to the conduit and pressure chamber or relieving the pressure in the conduit, and a check valve in the conduit which check valve vents the pressure chamber when the pressure in the conduit is relieved.

47. In fluid pressure controlled transmissions, in combination, a rotatable driving member, a rotatable driven member, a rotatable clutch having friction elements which connects the members when pressed together, a piston, a rotatable fluid pressure chamber which actuates the piston to press the friction elements together, means for supplying liquid under pressure to the chamber and for interrupting and relieving the supply pressure, a clutch release spring which opposes force of the piston on the friction elements, and means for relieving pressure on the piston from liquid contained in the rotating chamber after the supply pressure is relieved, said last mentioned means including a vent passage connected to said chamber and means for opening and closing the vent passage, the last-mentioned means being urged toward open position by the pressure of liquid in the chamber and closed by force exerted by the friction elements when pressed together.

48. In fluid pressure controlled transmissions, in combination a rotatable driving member, a rotatable driven member, a clutch having friction elements which connects the members, a piston, a rotatable fluid pressure chamber which actuates the piston to press the friction elements together, means for supplying liquid under pressure to the chamber and for interrupting and relieving the supply pressure, and means for relieving pressure on the piston from liquid contained in the rotating chamber after the supply pressure is relieved, said last mentioned means including a clutch release spring which opposes force of the piston on the friction elements, a passage through the piston adjacent its periphery, a valve seat in the passage, and a valve member seated to close the passage by force exerted on the valve by the friction elements when pressed together and unseated by pressure of liquid in the chamber.

49. In fluid pressure controlled transmissions, in combination a rotatable driving member, a rotatable driven member, a clutch having engageable and disengageable friction means which connects the members, a piston, a rotatable fluid pressure chamber which actuates the piston to hold the friction means engaged, means for supplying liquid under pressure to the chamber and for interrupting and relieving the supply pressure, and means for preventing pressure on the piston from liquid in the chamber after the supply pressure is relieved, said last mentioned means including a clutch release spring which opposes force of the piston on the friction elements, a passage through the piston adjacent its periphery, a valve seat in the passage spaced from the friction means, and a valve in the passage which is urged away from the seat by pressure of liquid in the chamber, the dimensions of the valve and the distance of the seat from the friction means, when engaged, being so related that the friction means seats the valve when the friction means is engaged.

50. In fluid pressure controlled transmissions, in combination a rotatable driving member, a rotatable driven member, a clutch having engageable and disengageable friction means adapted to connect the members, a piston, a rotatable fluid pressure chamber adapted to actuate the piston to hold the friction means engaged, means for supplying liquid under pressure to the chamber and for interrupting and relieving the supply pressure, and means for preventing pressure on the piston caused by centrifugal force on liquid in the chamber when the supply pressure is relieved, said last mentioned means including a passage through the piston adjacent its periphery, a conical valve seat surrounding the passage and spaced from the friction means, and a ball valve adjacent the seat adapted to be urged away from the seat by pressure of liquid in the chamber, the distance of the seat from the friction means when engaged being so related to the diameter of the ball that the friction means when engaged seats the ball to close the passage.

51. In fluid pressure controlled transmissions, in combination, rotatable driving and driven members, a clutch having engageable and disengageable friction means which connects the members, a piston which holds the friction means engaged, rotatable fluid pressure chamber for actuating the piston, means for supplying liquid under pressure to the chamber to actuate the piston to hold the friction means engaged and for venting the chamber to permit disengagement of the friction means, and means for preventing pressure on the piston from liquid in the chamber when the chamber is vented, said last mentioned means including a clutch release spring which opposes force of the piston on the friction means and a valve closed by force exerted on the valve by the friction means when the friction means is engaged and opened in response to movement of the piston by the release spring.

52. In a transmission, in combination driving and driven members, planetary gearing including torque-sustaining reaction means and adapted selectively to connect the members at different speed ratios, a clutch and fluid pressure actuator therefor adapted to lock the gearing to effect direct drive, a brake for holding the reaction member and fluid pressure actuator therefor adapted to establish drive at a ratio other than unity, means including conduits for selectively supplying fluid under pressure to the actuators and for selectively venting the actuators, the conduit supplying fluid to the clutch actuator having an orifice adapted to limit the rate of flow of fluid to the clutch actuator, a by-pass around the orifice, valve means responsive to torque reaction on the brake for controlling the maintenance of pressure in the brake actuator whenever fluid is supplied to the clutch actuator and valve means responsive to torque reaction on the brake for opening and closing the by-pass.

53. In a transmission, in combination driving and driven members, planetary gearing including torque-sustaining reaction means and adapted selectively to connect the members at different speed ratios, a clutch and fluid pressure actuator therefor adapted to lock the gearing to effect direct drive, a brake for holding the reaction member and fluid pressure actuator therefor adapted to establish drive at a ratio other than unity, means including conduits for selectively supplying fluid under pressure to the actuators, and for selectively venting the actuators, said conduits including a high rate passage and a low rate passage in parallel therewith, supplying fluid to the clutch actuator, valve means responsive to torque reaction of the brake for controlling the maintenance of pressure in the brake actuator whenever fluid is supplied to the clutch actuator and valve means responsive to torque reaction on the brake for selectively opening and closing the high rate passage.

54. In a transmission, in combination, a driven and driven members, planetary gearing including torque-sustaining reaction means and adapted selectively to connect the members at different speed ratios, a clutch and fluid pressure actuator therefor adapted to lock the gearing to effect direct drive, a brake for holding the reaction member and fluid pressure actuator therefor adapted to establish drive at a ratio other than unity, means including conduits for selectively supplying fluid under pressure to the actuators and for selectively venting the actuators, said conduits including a high rate passage and a low rate passage in parallel therewith supplying fluid to the clutch actuator, and valve means responsive to torque reaction on the brake for selectively opening and closing the high rate passage.

55. A power transmission comprising in combination driving and driven members, planetary gearing adapted selectively to connect the members at a plurality of speed ratios, the gearing including a reaction member adapted to sustain reverse torque for providing forward drive at a ratio other than unity, a brake for holding the torque sustaining member against reverse torque to establish forward drive, a clutch for locking the gearing to establish direct drive, the clutch being adapted to exert forward torque on the reaction member when the gearing is in direct drive, fluid pressure actuators for the clutch and brake, means for selectively directing fluid under pressure to the brake actuator and venting the clutch actuator at one time and directing fluid under pressure to the clutch actuator and opening a vent passage for the brake actuator at another time and means responsive to the direction of torque exerted by the reaction member for preventing communication between the brake actuator and said vent passage when fluid is directed to the clutch actuator and as long as the reaction member exerts reverse torque on the brake.

56. A power transmission comprising in combination driving and driven members, planetary gearing adapted selectively to connect the members at a plurality of speed ratios, the gearing including a reaction member adapted to sustain reverse torque for providing forward drive at a ratio other than unity, a brake for holding the torque-sustaining member against reverse torque to establish forward drive, a clutch for locking the gearing to establish direct drive, the clutch being adapted to exert forward torque on the reaction member when the gearing is in direct drive, fluid pressure actuators for the clutch and brake, means for selectively directing fluid under pressure to the actuators, and control means responsive to the torque on the brake adapted to admit fluid at a high rate to the clutch actuator when fluid is directed thereto and to reduce the rate of flow of fluid to the clutch actuator when the forward torque exerted by the clutch on the reaction member has overcome the negative torque exerted on the reaction member by the gearing.

57. A power transmission comprising in combination driving and driven members, planetary gearing adapted selectively to connect the members at a plurality of speed ratios, the gearing including a reaction member adapted to sustain reverse torque for providing forward drive at a ratio other than unity, a brake for holding the torque-sustaining member against reverse torque to establish forward drive, a clutch for locking the gearing to establish direct drive, the clutch being adapted to exert forward torque on the reaction member when the gearing is in direct drive, fluid pressure actuators for the clutch and brake, means for selectively directing fluid under pressure to the brake actuator and venting the clutch actuator at one time and directing fluid under pressure to the clutch actuator and opening a vent passage for the brake actuator at another time, means for regulating the pressure of fluid supplied to the actuators, means responsive to the directing of fluid to the clutch actuator for reducing the pressure of fluid supplied to the brake actuator, and means responsive to the direction of torque exerted on the reaction member for preventing communication between the brake actuator and the vent passage as long as the reverse torque exerted by the gearing on the reaction member exceeds the torque exerted on the reaction member by the clutch.

58. In a power transmission in combination, driving and driven members, step ratio gearing including a torque-sustaining reaction member adapted to connect the driving and driven members at a speed ratio other than unity, a clutch for establishing direct drive between the driving and driven members, a fluid pressure actuator for the clutch, a brake band for holding the reaction member and having an apply end and an anchor end, a fluid pressure actuator for the apply end, a control valve for selectively directing fluid under pressure to the actuators, and a timing valve adapted to control the pressure in the clutch actuator when fluid is directed thereto, the valve being actuated by the anchor end of the brake to control the clutch pressure in response to torque exerted on the brake by the reaction member.

59. The combination set forth in claim 58 having accumulator valve devices located in passages connecting the said control valve to said actuators, said valve devices being operative and effective to provide gradual actuation of said actuators and to provide rapid release of said actuators upon shifts of said control valve to cause actuation of either of said brake or said clutch, the said valve devices having effective pressure-responsive areas subjected to the variations of fluid pressure caused by pressure directing action of said control valve.

60. The combination set forth in claim 58 having a fluid supply system including pumps to supply said control valve and said timing valve, a feed passage leading to said control valve from said pumps, and a line-pressure regulator valve operative to maintain the pressure feed of said pumps at a value to hold established the driving ratios of said unit determined by the said clutch and brake.

61. The combination set forth in claim 58 having a reverse reaction gear element in said gearing, a reaction drum for said gear element, a brake for said drum, a fluid pressure actuator for said brake, a port of said control valve connected through a delivery passage to said reverse brake actuator, a fluid pressure supply system including a line pressure regulator valve effective under predetermined conditions of forward drive to provide a predetermined pressure to feed passages leading to said control valve, and a fluid pressure passage connected from the said reverse brake actuator, to apply a regulatory force to said regulator valve such that when said reverse brake actuator is applying said reverse brake, the pressure provided to said feed passages is higher than the said pressure under predetermined forward drive conditions.

62. The combination set forth in claim 58 having a pressure supply system including pumps feeding a main pressure passage, a regulator valve in said passage adapted to control the feed to said control valve, said regulator valve maintaining a predetermined pressure in said passage during direct drive; and a connection from said brake actuator to said regulator valve effective to superimpose an added regulation force thereon, such that when said control valve is moved to deliver actuation pressure to said low gear reaction brake, the pressure furnished by said regulator valve to said passage is increased.

63. In a power transmission in combination, driving and driven members, step ratio gearing including a torque-sustaining reaction member adapted to connect the driving and driven members at a speed ratio other than unity, a clutch for establishing direct drive between the driving and driven members, a fluid pressure actuator for the clutch, a brake band for holding the reaction member and having an apply end and an anchor end, a fluid pressure actuator for the apply end, a control valve for selectively directing fluid under pressure to the actuators and a timing valve adapted to control the rate of flow of fluid to the clutch actuator when fluid is directed thereto, the valve being actuated by the anchor end of the brake to control the rate of flow in response to torque exerted on the brake by the reaction member.

64. In a power transmission in combination, driving and driven members, step ratio gearing including a torque-sustaining reaction member adapted to connect the driving and driven members at a speed ratio other than unity, a clutch for establishing direct drive between the driving and driven members, a fluid pressure actuator for the clutch, a brake having limited movement for holding the reaction member, the brake being adapted to be moved in one direction by the reaction member when the brake establishes drive, means normally urging the brake in the opposite direction, fluid pressure actuators for the clutch and brake, means for selectively directing fluid under pressure to the actuators, and a valve for controlling the flow of fluid to the clutch actuator when fluid is directed thereto, the valve being operated by the brake in its movement to control the rate of flow in response to the position of the brake.

65. A control system for a fluid operated variable speed power transmitting device having a pump driven from the power input member of the device and a pump driven from the power output member of the device, said system comprising check valve means, passages connecting one side of the check valve means to the output of one pump and the other side of said check valve means to the output of the other pump, and a pump selector valve connected to the output of the check valve means, said pump selector valve having a plunger, spring means urging the plunger in one direction, and means for conducting the output of the check valve means to the side of the plunger opposite the spring to oppose the action of the spring, said pump selector valve having output ports adapted to be successively connected to or disconnected from the output of the check valve means by the plunger, one of said ports being a vent port and serving to limit the maximum pressure produced in the system.

66. A control system for a fluid operated variable speed power transmitting device, a first pump in said system driven from the power input member of the device, and a second pump in said system driven from the power output member of the device, a pressure regulating valve means in said system, means for connecting said valve means to the output of the first pump, and means for connecting the valve means to the output of the second pump, said valve means including hydraulically actuated means sensitive to pressure supplied by the second pump, a port in said regulating valve connected to the intake of the first-mentioned pump, said hydraulically actuated means connecting said port to the outlet of the first pump when said pressure reaches a predetermined degree to cause said first pump to idle when the second pump is supplying fluid at a predetermined pressure.

67. In a transmission having means for controlling the rate of engagement of a friction torque-establishing device, the combination of a fluid pressure operated motor for engaging said friction torque-establishing device, a source of fluid pressure, a fluid pressure transmitting line connecting said source and said motor, and a regulating device disposed in said fluid pressure transmitting line for controlling the supply of fluid pressure to said motor to thereby control the rate of engagement of said friction torque-establishing device, said regulating device comprising a cylinder having a reciprocable piston disposed therein, a peripheral fluid transmitting groove in said piston defining a high-rate passage, means for urging said piston toward one position in which it establishes fluid communication between said source and said motor through said groove, a pressure face on said piston exposed to the fluid pressure in said motor for moving said piston in opposition to said urging means to a second position in which it interrupts the fluid communication between said source and motor through said groove, and means defining a low-rate passage between said source and motor and disposed in parallel with said high rate passage, whereby fluid supplied by said source initially flows through both said high and low-rate passages to effect a relatively fast partial engagement of said friction torque-establishing device and after said piston closes the high-rate passage the fluid flows only through said low-rate passage to effect slowly full engagement of said firiction torque-establishing device.

68. A device for controlling the rate of engagement of a friction torque-establishing device as set forth in claim 67 wherein the regulating device also includes a check valve which opens automatically when the fluid pressure from said source is released for effecting the rapid discharge of fluid from said motor and a consequent fast disengagement of said friction torque-establishing device.

69. In a clutch or brake having frictionally engageable clutch or brake members: hydraulic mechanism for effecting engagement of said members; said mechanism comprising a cylinder; a piston slidable within said cylinder, a power operated positive-displacement hydraulic pump; a pressure relief valve for limiting the maximum pump output pressure; a passageway providing communication between said cylinder and the output side of said pump for supplying liquid to said cylinder against said piston for moving said piston to effect engagement of said membrs; a valve for said passageway for controlling the supply of said liquid therethrough from said pump to said cylinder; an auxiliary chamber communicating with said passageway on the cylinder side of said control valve, said auxiliary chamber having a wall movable in response to an increase in the pressure in said passageway on the cylinder side of said control valve for increasing the volume of said chamber in communication with said passageway; and elastic means opposing said chamber wall movement such that said wall is movable against said elastic means in response to pressure increases in said passageway on the cylinder side of said control valve at pressures below said maximum value.

70. In a clutch or brake for a multi-speed transmission in which said clutch or brake includes members frictionally engageable to effect a speed-ratio change of said transmission: hydraulic mechanism for effecting engagement of said members; said mechanism comprising a cylinder, a piston slidable within said cylinder; a power-operated positive-displacement hydraulic pump continuously operative during operation of the transmission; a pressure relief valve for limiting the maximum pump output pressure; a passageway providing communication between said cylinder and the output side of said pump for supplying liquid to said cylinder against said piston for moving said piston to effect engagement of said members; a valve for said passageway for controlling the supply of said liquid therethrough from said pump to said cylinder, said control valve being movable independently of said pressure relief valve; an auxiliary chamber communicating with said passageway on the cylinder side of said control valve, said auxiliary chamber having a wall movable in response to an increase in the pressure in said passageway on the cylinder side of said control valve for increasing the volume of said chamber in communication with said passageway; and elastic means opposing said chamber wall movement such that said wall is movable against said elastic means in response to pressure increases in said passageway on the cylinder side of said control valve at pressures below said maximum value.

71. In a fluid pressure control system for change-speed gearing having at least three fluid pressure actuators which establish different drive connections through said gearing, the combination of a source of pressure fluid, means including a selector valve and passages which supplies fluid from the source to one or another of said actuators and simultaneously vents actuators not supplied to establish one or another of said drive connections, and a pressure regulator valve which is operative to maintain one pressure range in the system, said pressure regulator valve having a plurality of pressure-responsive means operative when supplied with fluid under pressure to maintain a different pressure range in the system, each of said pressure responsive means having a permanent fluid connection to a separate one of said actuators so that each pressure-responsive means is supplied with pressure when and only when the corresponding actuator establishes a drive connection.

72. In a fluid pressure control system for transmissions the combination of driving and driven shafts; a friction torque-establishing device operated by a fluid pressure chamber for establishing a driving connection between the shafts; a first pump having an inlet and operative to supply fluid under pressure from an outlet whenever the driving shaft rotates; a second pump having an inlet and operative to supply fluid under pressure from an outlet whenever the driven shaft rotates in one direction; check valve means receiving pressure fluid from both outlets; a pressure regulator valve having a fluid supply chamber receiving pressure fluid from the check valve means and a valve element urged by the pressure of fluid in the supply chamber to move against the force of a return spring so that the position of the valve element is a measure of the pressure in the supply chamber; a first connection between the outlet of the first pump and the inlet of the first pump which connection is normally closed by the regulator valve element under the influence of the spring and is opened at a predetermined pressure of the supply chamber to cause the first pump to idle; a second connection between the supply chamber and the inlet of both pumps which is normally closed by the regulator valve element under the influence of the spring and is opened at a second predetermined pressure in the supply chamber; and a fluid connection from the outlets of both pumps to the fluid pressure chamber of the friction torque-establishing device whereby a predetermined torque is maintained in the friction torque-establishing device by the first pump when the pressure of the second pump is below a predetermined value and a predetermined torque is maintained by the second pump with the first pump idling when the pressure of the second pump is above a predetermined value.

73. In a fluid pressure control system for transmission the combination of driving and driven shafts; a friction torque-establishing device operated by a fluid pressure chamber for establishing a driving connection between the shafts; a first pump having an inlet and operative to supply fluid under pressure from an outlet whenever the driving shaft rotates; a second pump having an inlet and operative to supply fluid under pressure from an outlet whenever the driven shaft rotates in one direction; check valve means receiving pressure fluid from both outlets; a pressure-responsive valve having a fluid supply chamber receiving pressure fluid from the check valve means and a valve element urged by the pressure of fluid in the supply chamber to move against the force of a return spring so that the position of the valve element is a measure of the pressure in the supply chamber; a connection between the outlet of the first pump and the inlet of the first pump which connection is normally closed by the regulator valve element under the influence of the spring and is opened at a predetermined pressure of the supply chamber to unload the first pump; and a fluid connection from the outlets of both pumps to the fluid pressure chamber of the friction torque-establishing device whereby torque is maintained in the friction torque-establishing device by the first pump when the pressure of the second pump is below a predetermined value and is maintained by the second pump with the first pump unloaded when the pressure of the second pump is above a predetermined value.

74. In a power transmission, in combination, driving and driven members, a friction torque-establishing device for establishing a driving connection between the members, a fluid pressure actuator for the friction torque-establishing device, means for selectively connecting the actuator to a source of fluid under pressure and to a vent, and means for controlling the rate of fluid flow to and from the actuator including means providing two paths of flow at high rate between the selective connecting means and the actuator and including means providing a constantly open path of flow restricted to a low rate between the selective connecting means and the actuator, a first valve responsive to a predetermined pressure in the actuator for preventing flow through one high-rate path and a check valve responsive to a higher pressure in the selective connecting means than in the actuator for preventing flow through the other high-rate path, the check valve also being responsive to a lower pressure in the selective connecting means than in the actuator for permitting flow through said other high-rate path.

75. In a power transmission in combination, driving and driven members, a friction torque-establishing device for establishing a driving connection between the members, a fluid pressure actuator for the friction torque-establishing device, means for selectively connecting the actuator to a source of fluid under pressure and to a vent, and means for controlling the rate of flow of fluid to and from the actuator including means providing a constantly open path of flow restricted to a low rate between the selective connecting means and the actuator and including means providing two paths of flow at high rate between the selective connecting means and the actuator, a first valve responsive to a predetermined pressure in the actuator for preventing flow through high-rate path and a check valve normally preventing flow through the other high-rate path, and responsive to a lower pressure in the selective connecting means than in the actuator for permitting flow through said other high-rate path.

76. A power transmission comprising in combination driving and driven members; a friction torque-establishing device which when engaged establishes torque between the members which varies with the pressure in the actuator; a fluid pressure actuator for the friction torque-establishing device; a source of fluid under limited maximum pressure; an actuator supply conduit; a selector valve which selectively connects the actuator supply conduit to the source or to a vent; and means for controlling the rate of engagement and disengagement of the friction torque-establishing device including a low-rate passage, a normally open high-rate supply passage, a high rate vent passage which is closed whenever the pressure in the supply conduit exceeds the pressure in the actuator, said three passages being connected between the supply conduit and the actuator, means responsive to a predetermined pressure in the actuator less than said maximum for closing the high-rate supply passage to retard the rate of increase of torque in the friction torque-establishing device, and means responsive to excess of pressure in the actuator over the pressure in the supply conduit for opening the high-rate vent passage to permit rapid disengagement of the friction torque-establishing device.

77. In a transmission having means for controlling the rate of increase of torque in a friction torque-establishing device, the combination of a fluid pressure operated motor for engaging said device; a source of fluid pressure; a fluid pressure transmitting conduit connecting the source and the motor; and a regulating device disposed in the conduit for controlling the supply of fluid pressure to the motor thereby to control the rate of increase of torque in the friction torque-establishing device, said regulating device including a cylinder having a reciprocable piston therein, a high-rate passage which conducts fluid between the source and the motor and which opens into the cylinder, means on the piston for opening and closing the passage, means urging the piston toward one position which opens the passage, a pressure area on the piston exposed to the fluid pressure in the motor for moving the piston in opposition to said urging means to a second position in which it closes the passage, and means defining a low-rate passage which conducts fluid between the source and the motor in parallel with the high-rate passage whereby fluid supplied by said source initially flows through both said passages to effect quickly the establishment of low torque in said friction torque-establishing device and after said piston closes the high-rate passage the fluid flows only through the low rate passage to effect slowly increase of torque to maximum in the friction torque-establishing device.

78. A device for the automatic control of friction means, comprising in combination a power driven actuator operative to produce an actuating force for the engagement of said friction means, an adjustable power control member for controlling said actuator, a source of power providing an actuating force, connecting means connecting said power driven actuator with said source through said power control member including means for reducing said actuating force supplied by said source, a time-controlled element movable under the influence of a force and adapted during movement thereof to control the rate of engagement of said friction means by said power-driven actuator, means for reducing the strength of said last-mentioned force during the largest part of movement of said time controlled element, and means operatively connecting said time controlled element with said power control member and said first-mentioned reducing means, to provide timed adjustment of said actuator to first move said friction means into slight engagement, to thereupon build up friction at a slow rate to a value at which said friction means ceases slipping, and to subsequently increase said friction well beyond said value.

79. The device according to claim 78 wherein said last-mentioned means provide timed adjustment of said actuator to first move said friction means into slight engagement at a fast rate.

80. A device for the automatic control of a friction means, comprising in combination a power-driven actuator including a fluid-operated ram, a source of operating fluid, a duct connecting said source with said ram, an adjustable valve in said duct for determining pressure of the operating fluid admitted from said source to said actuator, a time-controlled element movable under the influence of a force, means for reducing the strength of said force during the largest portion of movement of said time-controlled element, and means actuated by said time-controlled element and operative to perform timed adjustment of said valve to cause said actuator to first move said friction means into slight engagement, to thereupon build up friction at a slow rate to a value at which said friction means ceases slipping and to subsequently increase the friction produced by said actuator well beyond said value, said power-driven actuator including a spring cooperating with said ram and adapted to move the same in a direction opposite to the force produced by said operating fluid.

81. In a control system for a variable speed transmission having two friction means for the operation of gears, the combination comprising a power-driven actuating mechanism co-ordinated to the friction means and adapted to produce an actuating force acting alternatively on one or the other of the same, at least one adjustable power-control member adapted to control said actuating mechanism and to determine the actuating force produced thereby, a movable time-controlled element, means adapted to be actuated by said time-controlled element and to perform timed adjustment of said power-control member causing said actuating mechanism to move one of the friction means first to slight engagement, to then gradually build up friction therein to a value at which the friction means ceases slipping and to subsequently increase said friction well beyond said value, and a movable member coordinated to both said time-controlled member and said actuating mechanism, and adapted to perform the dual function of rendering said time-controlled element operative to cause said power-control member to engage one of the friction means and of causing said actuating mechanism to quickly disengage the other one of the friction means.

82. The combination set forth in claim 81 in which said actuating mechanism comprises two fluid-operated rams, one for each of the friction means, and at least one spring mounted to counteract one of said rams.

83. In a control system for a variable speed transmission having two friction means for the operation of gears, the combination comprising a power-driven actuating mechanism comprises two fluid-operated rams, one for each of the friction means, and at least one spring mounted to counteract one of said rams.

83. In a control system for a variable speed transmission having two friction means for the operation of gears, the combination comprising a power-driven actuating mechanism co-ordinated to said friction means and adapted to produce an actuating force acting alternatively on one or the other of the same, at least one adjustable power-control member adapted to control said actuating mechanism and to determine the actuating force produced thereby, a movable time-controlled element, means adapted to be actuated by said time-controlled element and to perform timed adjustment of said power-control member causing said actuating mechanism to move one of the friction means first to slight engagement, to then gradually build up friction therein to a value at which the friction means ceases slipping and to subsequently increase said friction well beyond said value, and a movable member co-ordinated to both, said time-controlled member and said actuating mechanism and adapted to perform the dual function of rendering said time-controlled element operative to cause said power-control member to move one of the friction means to slight engagement and of simultaneously causing said actuating mechanism to quickly disengage the other one of the friction means.

84. In a control system for a variable speed transmission, the combination comprising two friction means for the selective operation of gears, a power-driven actuating mechanism co-ordinated to said friction means and adapted to produce an actuating force acting alternatively on one or the other of the same, said mechanism including two fluid-operated rams, one for each of said friction means, and at least one spring mounted to counteract one of said rams, a source of operating fluid, a duct connecting the latter with said actuating mechanism, an adjustable valve in said duct adapted to determine the pressure of the operating fluid admitted from said source to said actuating mechanism, a movable time-controlled element, means adapted to be actuated by said time-controlled element and to perform timed adjustment of said valve to cause said actuating mechanism to move one of the friction means first to slight engagement, to then gradually build up friction therein to a value at which the friction means ceases slipping and to subsequently increase said friction well beyond said value, and a second valve communicating with both, said mechanism and said time-controlled element and adapted to perform the dual function of causing said fluid to operate said time-controlled element whereby said valve brings about the engagement of one of the friction means, and of simultaneously causing said actuating mechanism to quickly disengage the other one of the friction means.

85. In a control system for an epicyclic gear having three gear elements mounted for rotation about a common axis, a first friction means for arresting one of the elements, a second friction means for coupling the latter with one of the two other elements, a power driven actuating mechanism co-ordinated to the friction means and adapted to produce an actuating force acting alternatively on one or the other of the same, at least one adjustable power-control member adapted to control said actuating mechanism and to determine the actuating force produced thereby, a movable time-controlled element connected with said adjustable power-control member and adapted, when operative, to effect an adjustment thereof which causes said actuating mechanism to move one of the friction means first to slight engagement, to then gradually build up friction therein to a value at which the friction means ceases slipping and to subsequently increase said friction well beyond said value, and a movable member co-ordinated to both, said time-controlled member and said actuating mechanism and adapted to perform the dual function of rendering said time-controlled element operative to cause said power-control member to engage one of the friction means and of causing said actuating mechanism to quickly disengage the other one of the friction means.

86. In a control system of the character described, the combination comprising a hydraulic actuator for friction means, a source of pressure fluid connected with said actuator for actuating the same, an adjustable throttle valve connected with said source and, depending on its adjustment, varying the pressure of said fluid, a time-controlled element movable under the influence of a force, means for directly reducing said last-mentioned force during the largest portion of movement of said time-controlled element, and means actuated by said time-controlled element to perform timed adjustment of said valve to thereby provide only gradual engagement of said friction means by said actuator depending on the pressure of said fluid as determined by said adjustable valve.

87. In combination with a change-speed gear having two friction means, each of said friction means being adjustable from a disengaged condition to an engaged condition with one of said friction means being engaged while the other of said friction means is disengaged and vice versa, a control means for engaging the disengaged friction means and for disengaging the engaged friction means, and timing means connected with said control means for effecting relative rapid disengagement of the previously engaged friction means and for effecting initially relative rapid slight engagement of the previously disengaged friction means to produce slipping engagement thereof, to thereupon further increase engagement of the previous disengaged friction means at a relatively slow rate to a point at which slippage ceases, and to finally increase further engagement of the previously disengaged friction means well beyond said point.

88. A power transmission comprising an hydraulic torque converter including an impeller and a turbine cooperably related to form a toroidal circuit, a shaft driven by the turbine, a stationary member in which the shaft is journaled, and hydraulic circuit means including the converter, a pump driven by the impeller, an hydraulically actuated friction plate clutch providing a connection between the shaft and a load, a control valve for determining the engagement and release of the clutch, passage means including an inlet passage in the stationary member connecting the converter to the pump pressure line anterior to the control valve and having a pressure regulating valve for determining the engaging pressure of the clutch, and an outlet passage from the converter included between the member and shaft.

References Cited in the file of this patent

UNITED STATES PATENTS

| | | |
|---|---|---|
| 583,581 | Randerson et al. | June 1, 1897 |
| 1,780,293 | Christie et al. | Nov. 4, 1930 |
| 2,191,669 | Kress | Feb. 27, 1940 |
| 2,193,305 | Thompson | Mar. 12, 1940 |
| 2,195,605 | Thompson | Apr. 2, 1940 |
| 2,204,872 | Thompson | June 18, 1940 |
| 2,329,724 | Maurer | Sept. 21, 1943 |
| 2,332,593 | Nutt et al. | Oct. 26, 1943 |
| 2,376,545 | Livermore | May 22, 1945 |
| 2,386,220 | Lawler et al. | Oct. 9, 1945 |
| 2,407,289 | La Brie | Sept. 10, 1946 |
| 2,541,391 | Weiss et al. | Feb. 13, 1951 |
| 2,548,208 | Evernden | Apr. 10, 1951 |
| 2,576,336 | Farkas | Nov. 27, 1951 |
| 2,645,137 | Roche | July 14, 1953 |

FOREIGN PATENTS

| | | |
|---|---|---|
| 474,539 | Great Britain | Nov. 3, 1937 |

OTHER REFERENCES

"Shop Manual Hydra-Matic-Drive 1941 Cadillac Cars" (copyright 1940, General Motors Sales Corp., page 15).

"Automobile Engineer," December 1941 (pp. 443–447).

UNITED STATES PATENT OFFICE
CERTIFICATE OF CORRECTION

Patent No. 3,164,034 January 5, 1965

Oliver Kenneth Kelley

It is hereby certified that error appears in the above numbered patent requiring correction and that the said Letters Patent should read as corrected below.

Column 10, line 19, for "1330b" read -- 130b --; line 34, for "149" read -- 49 --; line 40, for "60" read -- 50 --; column 12, line 26, for "160" read -- 150 --; column 13, line 3, for "boat" read -- boost --; line 8, for "148" read -- 146 --; line 30, for "meting" read -- metering --; line 35, after "pressure" isert -- of --; line 40, after "f", in italics, insert -- of --; same column 13, line 68, before "ratio" insert -- shift of --; line 71, for "lower" read -- low --; line 72, for "hand" read -- land --; column 14, line 28, strike out "to", first occurrence; column 15, line 40, for "control" read -- controlled --; column 16, line 18, for "176" read -- 175 --; line 21, for "170" read -- 179 --; line 39, for "transverses" read -- traverses --; line 52, before "flow" insert -- toroidal --; column 30, line 21, for "a driven" read -- driving --; column 37, lines 30 to 35, strike out the following:

> 83. In a control system for a variable speed transmission having two friction means for the operation of gears, the combination comprising a power-driven actuating mechanism comprises two fluid-operated rams, one for each of the friction means, and at least one spring mounted to counteract one of said rams.

Signed and sealed this 6th day of July 1965.

(SEAL)
Attest:

ERNEST W. SWIDER
Attesting Officer

EDWARD J. BRENNER
Commissioner of Patents